(12) United States Patent
Kompella

(10) Patent No.: US 7,936,780 B1
(45) Date of Patent: May 3, 2011

(54) HIERARCHICAL LABEL DISTRIBUTION PROTOCOL FOR COMPUTER NETWORKS

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 24 days.

(21) Appl. No.: 12/400,478

(22) Filed: Mar. 9, 2009

Related U.S. Application Data

(60) Provisional application No. 61/035,889, filed on Mar. 12, 2008.

(51) Int. Cl.
*H04J 3/16* (2006.01)

(52) U.S. Cl. .................. 370/466; 370/254; 370/471

(58) Field of Classification Search .................. None
See application file for complete search history.

(56) References Cited

U.S. PATENT DOCUMENTS

| | | |
|---|---|---|
| 5,600,642 A | 2/1997 | Pauwels et al. |
| 6,374,303 B1 | 4/2002 | Armitage et al. |
| 6,477,166 B1 | 11/2002 | Sanzi et al. |
| 6,493,349 B1 | 12/2002 | Casey |
| 6,501,754 B1 | 12/2002 | Ohba et al. |
| 6,553,028 B1 | 4/2003 | Tang et al. |
| 6,597,703 B1 | 7/2003 | Li et al. |
| 6,611,528 B1 | 8/2003 | Farinacci et al. |
| 6,625,773 B1 | 9/2003 | Boivie et al. |
| 6,731,652 B2 | 5/2004 | Ramfelt et al. |
| 6,751,218 B1 | 6/2004 | Hagirahim et al. |
| 6,778,531 B1 | 8/2004 | Kodialam et al. |
| 6,807,182 B1 | 10/2004 | Dolphin et al. |
| 6,879,594 B1 | 4/2005 | Lee et al. |
| 6,920,503 B1 | 7/2005 | Nanji et al. |
| 6,968,389 B1 | 11/2005 | Menditto et al. |
| 7,035,226 B2 | 4/2006 | Enoki et al. |
| 7,039,687 B1 | 5/2006 | Jamieson et al. |
| 7,082,102 B1 | 7/2006 | Wright |
| 7,133,928 B2 | 11/2006 | McCanne |
| 7,136,374 B1 | 11/2006 | Kompella |

(Continued)

FOREIGN PATENT DOCUMENTS

JP 2005130258 A 5/2005

(Continued)

OTHER PUBLICATIONS

Office Action from U.S. Appl. No. 11/566,480, dated Nov. 27, 2009, 36 pp.

(Continued)

*Primary Examiner* — Bob A Phunkulh
(74) *Attorney, Agent, or Firm* — Schumaker & Sieffert, P.A.

(57) ABSTRACT

Techniques are described for providing routing scalability within a protocol such as a label distribution protocol. A method comprises receiving a label mapping message at an ingress router for establishing a label switched path (LSP) that identifies within a first portion a first label to be used for forwarding network traffic to an intermediate router of the LSP, and identifies within a separate portion a second label to be used for forwarding network traffic to an egress router of the LSP. The method further comprises parsing the first and separate portions, installing first forwarding state at the ingress router identifying the first label for forwarding network traffic to the intermediate router, and installing second forwarding state at the ingress router identifying a two-label stack comprising the first label as an outer label and the second label as an inner label for forwarding network traffic to the egress router.

35 Claims, 6 Drawing Sheets

U.S. PATENT DOCUMENTS

| | | | |
|---|---|---|---|
| 7,251,218 B2 | 7/2007 | Jorgensen | |
| 7,269,135 B2 | 9/2007 | Frick et al. | |
| 7,281,058 B1 | 10/2007 | Shepherd et al. | |
| 7,330,468 B1 | 2/2008 | Tse-Au | |
| 7,333,491 B2 | 2/2008 | Chen et al. | |
| 7,359,328 B1 | 4/2008 | Allan | |
| 7,360,084 B1 | 4/2008 | Hardjono | |
| 7,366,894 B1 | 4/2008 | Kalimuthu et al. | |
| 7,418,003 B1 | 8/2008 | Alvarez et al. | |
| 7,463,591 B1 | 12/2008 | Kompella et al. | |
| 7,477,642 B2 | 1/2009 | Aggarwal et al. | |
| 7,483,439 B2 | 1/2009 | Shepherd et al. | |
| 7,489,695 B1* | 2/2009 | Ayyangar | 370/396 |
| 7,545,735 B1 | 6/2009 | Shabtay et al. | |
| 7,570,638 B2* | 8/2009 | Shimizu et al. | 370/389 |
| 7,593,405 B2* | 9/2009 | Shirazipour et al. | 370/392 |
| 7,633,859 B2* | 12/2009 | Filsfils et al. | 370/225 |
| 7,768,925 B2* | 8/2010 | He et al. | 370/236.2 |
| 2002/0071390 A1 | 6/2002 | Reeves et al. | |
| 2002/0109879 A1 | 8/2002 | Wing So | |
| 2002/0118644 A1 | 8/2002 | Moir | |
| 2002/0126672 A1 | 9/2002 | Chow et al. | |
| 2002/0181477 A1 | 12/2002 | Mo et al. | |
| 2002/0186664 A1 | 12/2002 | Gibson et al. | |
| 2002/0191584 A1 | 12/2002 | Korus et al. | |
| 2003/0012215 A1 | 1/2003 | Novaes | |
| 2003/0021282 A1 | 1/2003 | Hospodor | |
| 2003/0031175 A1 | 2/2003 | Hayashi et al. | |
| 2003/0043772 A1 | 3/2003 | Mathis et al. | |
| 2003/0056007 A1 | 3/2003 | Katsube et al. | |
| 2003/0063591 A1 | 4/2003 | Leung et al. | |
| 2003/0087653 A1 | 5/2003 | Leung et al. | |
| 2003/0088696 A1 | 5/2003 | McCanne | |
| 2003/0099235 A1 | 5/2003 | Shin et al. | |
| 2003/0108047 A1 | 6/2003 | Mackiewich et al. | |
| 2003/0112748 A1 | 6/2003 | Puppa et al. | |
| 2003/0123446 A1 | 7/2003 | Muirhead et al. | |
| 2003/0172114 A1 | 9/2003 | Leung | |
| 2003/0177221 A1 | 9/2003 | Ould-Brahim et al. | |
| 2003/0191937 A1 | 10/2003 | Balissat et al. | |
| 2004/0037279 A1 | 2/2004 | Zelig et al. | |
| 2004/0047342 A1 | 3/2004 | Gavish et al. | |
| 2004/0081154 A1 | 4/2004 | Kouvelas | |
| 2004/0151180 A1 | 8/2004 | Hu et al. | |
| 2004/0151181 A1 | 8/2004 | Chu et al. | |
| 2004/0165600 A1 | 8/2004 | Lee | |
| 2004/0190517 A1 | 9/2004 | Gupta et al. | |
| 2004/0218536 A1 | 11/2004 | Yasukawa et al. | |
| 2004/0240445 A1 | 12/2004 | Shin et al. | |
| 2004/0240446 A1 | 12/2004 | Compton | |
| 2005/0001720 A1 | 1/2005 | Mason et al. | |
| 2005/0018693 A1 | 1/2005 | Dull | |
| 2005/0027782 A1 | 2/2005 | Jalan et al. | |
| 2005/0097203 A1 | 5/2005 | Unbehagen et al. | |
| 2005/0108419 A1 | 5/2005 | Eubanks | |
| 2005/0111351 A1 | 5/2005 | Shen | |
| 2005/0129001 A1 | 6/2005 | Backman et al. | |
| 2005/0169270 A1 | 8/2005 | Mutou et al. | |
| 2005/0220132 A1 | 10/2005 | Oman et al. | |
| 2005/0232193 A1 | 10/2005 | Jorgensen | |
| 2005/0259674 A1* | 11/2005 | Cuervo et al. | 370/422 |
| 2005/0262232 A1 | 11/2005 | Cuervo et al. | |
| 2005/0265308 A1 | 12/2005 | Barbir et al. | |
| 2005/0271035 A1 | 12/2005 | Cohen et al. | |
| 2005/0271036 A1 | 12/2005 | Cohen et al. | |
| 2005/0281192 A1 | 12/2005 | Nadeau et al. | |
| 2006/0013141 A1 | 1/2006 | Mutoh et al. | |
| 2006/0039364 A1 | 2/2006 | Wright | |
| 2006/0047851 A1 | 3/2006 | Voit et al. | |
| 2006/0088031 A1 | 4/2006 | Nalawade | |
| 2006/0126496 A1 | 6/2006 | Filsfils | |
| 2006/0126630 A1* | 6/2006 | Shirazipour et al. | 370/392 |
| 2006/0133265 A1 | 6/2006 | Lee | |
| 2006/0147204 A1 | 7/2006 | Yasukawa et al. | |
| 2006/0153067 A1 | 7/2006 | Vasseur et al. | |
| 2006/0164975 A1 | 7/2006 | Filsfils | |
| 2006/0182034 A1 | 8/2006 | Klinker et al. | |
| 2006/0221958 A1 | 10/2006 | Wijnands et al. | |
| 2006/0262735 A1 | 11/2006 | Guichard et al. | |
| 2006/0262786 A1* | 11/2006 | Shimizu et al. | 370/389 |
| 2007/0036162 A1 | 2/2007 | Tingle et al. | |
| 2007/0098003 A1 | 5/2007 | Boers et al. | |
| 2007/0124454 A1 | 5/2007 | Watkinson | |
| 2007/0140107 A1 | 6/2007 | Eckert et al. | |
| 2007/0189177 A1* | 8/2007 | Zhai | 370/244 |
| 2007/0189291 A1* | 8/2007 | Tian | 370/390 |
| 2008/0056258 A1 | 3/2008 | Sharma et al. | |
| 2008/0112330 A1* | 5/2008 | He et al. | 370/241.1 |
| 2008/0123524 A1 | 5/2008 | Vasseur et al. | |
| 2008/0123654 A1 | 5/2008 | Tse-Au | |
| 2009/0028149 A1 | 1/2009 | Yasukawa et al. | |
| 2009/0225650 A1* | 9/2009 | Vasseur | 370/218 |

FOREIGN PATENT DOCUMENTS

| | | |
|---|---|---|
| JP | 2005167482 A | 6/2005 |
| JP | 2005252385 A | 9/2009 |
| KR | 2004001206 | 1/2004 |
| WO | 02091670 A2 | 11/2002 |
| WO | 2004071032 A1 | 8/2004 |

OTHER PUBLICATIONS

Office Action from U.S. Appl. No. 11/192,432, dated Dec. 21, 2009, 21 pp.

Response to Office Action dated Nov. 27, 2009, for U.S. Appl. No. 11/566,480, filed Jan. 22, 2010, 18 pp.

Office Action from U.S. Appl. No. 11/213,638, dated Nov. 14, 2009, 26 pp.

Response to Office Action dated Dec. 14, 2009, from U.S. Appl. No. 11/213,638, filed Feb. 16, 2010, 6 pp.

Office Action from U.S. Appl. No. 11/213,640, dated Dec. 24, 2009, 26 pp.

Response to Office Action dated Dec. 24, 2009, from U.S. Appl. No. 11/213,640, filed Mar. 24, 2010, 13 pp.

Response to Office Action dated Dec. 21, 2009, from U.S. Appl. No. 11/192,432, filed Mar. 22, 2010, 14 pp.

Swallow et al., "Network Scaling with Aggregated IP LSPs", Network Working Group, draft-swallow-mpls-aggregated-fec-00.txt, Jul. 2007, (10 pages).

Satyanarayana et al., "Extensions to GMPLS RSVP Graceful Restart", draft-aruns-ccamp-restart-ext-01.txt, Jul. 2004, Network Working Group Internet Draft, 23 pgs.

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocol RSVPTE.html.

U.S. Appl. No. 11/056,383, entitled "Fast Reroute Of Traffic Associated With A Point To Multi-Point Network Tunnel," filed Feb. 10, 2005.

U.S. Appl. No. 11/215,813, entitled "Point To Multi-Point Label Switched Paths With Label Distribution Protocol," filed Aug. 29, 2005.

U.S. Appl. No. 11/192,432, entitled "Transmission Of Layer Two (L2) Multicast Traffic Over Multi-Protocol Label Switching Networks," filed Jul. 28, 2005.

U.S. Appl. No. 11/212,509, entitled "Aggregate Multicast Trees For Multicast Virtual Private Networks," filed Aug. 26, 2005.

U.S. Appl. No. 11/212,500, entitled "Multicast Data Trees For Multicast Virtual Private Networks," filed Aug. 26, 2005.

U.S. Appl. No. 11/212,507, entitled "Reliable Exchange Of Control Information For Multicast Virtual Private Networks," filed Aug. 26, 2005.

U.S. Appl. No. 11/213,636, entitled "Transport Of Control And Data Traffic For Multicast Virtual Private Networks," filed Aug. 26, 2005.

U.S. Appl. No. 11/213,638, entitled "Shared Multicast Trees For Multicast Virtual Private Networks," filed Aug. 26, 2005.

U.S. Appl. No. 11/212,475, entitled "Label Switching Multicast Trees For Multicast Virtual Private Networks," filed Aug. 26, 2005.

U.S. Appl. No. 11/212,932, entitled "Multicast Trees For Virtual Private Local Area Network (LAN) Service Multicast," filed Aug. 26, 2005.

U.S. Appl. No. 11/213,637, entitled "Aggregate Multicast Trees For Virtual Private Local Area Network (LAN) Service Multicast," filed Aug. 26, 2005.

U.S. Appl. No. 11/212,490, entitled "Multicast Data Trees For Virtual Private Local Area Network (LAN) Service Multicast," filed Aug. 26, 2005.

U.S. Appl. No. 11/213,639, entitled "Exchange Of Control Information For Virtual Private Local Area Network (LAN) Service Multicast," filed Aug. 26, 2005.

U.S. Appl. No. 11/213,641, entitled "Inter-Autonomous System (AS) Multicast Virtual Private Networks," filed Aug. 26, 2005.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

Aggarwal et al., "Establishing Point to Multipoint MPLS TE LSPs," submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," Mar. 1995, 72 pgs.

L. Martini et al., "Transport of Layer 2 Frames Over MPLS," Network Working Group Internet Draft, draft-martini-l2circuit-trans-mpls-08.txt, Nov. 2001, 18 pgs.

L. Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Anderson et al., "LDP Specification", Network Working Group, RFC 3036, Jan. 2001, (118 pages).

Rekhter et al., "Carrying Label Information in BGP-4", Network Working Group, RFC 3107, May 2001 (6 pages).

Decraene et al. "LDP extensions for Inter-Area LSP", Network Working Group, draft-decraene-mpls-ldp-interatea-02.txt, Jun. 2006, (7 pages).

Decraene et al., "LDP extension for Inter-Area LSP", Network Working Group, draft-ietf-mpls-ldp-interarea-03.txt, Feb. 2008, (11 pages).

Shah et al., "Extensions to MPLS-based Layer 2 VPNs," Network Working Group, Sep. 2001, 14 pp.

Kompella, "Layer 2 VPNs Over Tunnels," Network Working Group, Jan. 2006, 27 pp.

Decraene et al., "LDP Extension for Inter-Area Label Switched Paths (LSPs)," Network Working Group RFC 5283, Jul. 2008, 12 pp.

Partial European Search Report from European application No. 09173544.9, dated Dec. 9, 2009, 6 pp.

Extended European Search Report from European application No. 09173544.9, dated Feb. 8, 2010, 14 pp.

Office Action from U.S. Appl. No. 11/213,640, dated Jun. 24, 2010, 25 pp.

Response to Office Action dated Jun. 24, 2010, from U.S. Appl. No. 11/213,640, filed Aug. 20, 2010, 7 pp.

Office Action from U.S. Appl. No. 12/403,496, dated Jul. 14, 2010, 21 pp.

Response to Office Action dated Jul. 14, 2010, from U.S. Appl. No. 12/403,496, filed Oct. 14, 2010, 15 pp.

* cited by examiner

HIERARCHICAL LABEL DISTRIBUTION PROTOCOL FOR COMPUTER NETWORKS

This application claims the benefit of U.S. Provisional Application No. 61/035,889, filed Mar. 12, 2008, the entire contents of which is incorporated herein by reference.

TECHNICAL FIELD

The invention relates to computer networks and, more particularly, to scalable routing and forwarding of packets within computer networks.

BACKGROUND

Routing devices within a network, often referred to as routers, maintain routing information bases (RIBs) of routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocols, such as an interior gateway protocol (IGP) or a Border Gateway Protocol (BGP).

When using a link-state IGP, such as the Open Shortest Path First protocol (OSPF) or Intermediate System to Intermediate System protocol (IS-IS), each router possesses information about the complete network topology. As a network grows large, scaling within the network may be necessary to manage the amount of network topology information exchanged by routers in the network. Link-state IGP, such as IS-IS or OSPF, addresses network scaling issues by hierarchically separating a network into multiple hierarchical areas or levels so as to increase routing scalability. For example, OSPF areas or IS-IS levels may be used to hierarchically partition the network into distinct areas, such as a backbone area that includes core routers, and one or more non-backbone areas. OSPF and IS-IS allow an autonomous system to, for example, be partitioned into different areas or levels so as to increase routing scalability within a routing domain. Any IGP area or level within the partitioned network need only maintain link state for the routers within the respective area. In this way, each of the IGP areas or levels many be viewed as a separate routing domain within the partitioned network, and link state information need not generally be exchanged between all of the routers of different areas, thus reducing the link-state information in the RIB maintained by each of the routers.

Using an IGP that employs such hierarchical scaling, each router in a given area stores both topological and reachability information for only other devices in the same area, and maintains only reachability information for all other areas in the network. In some cases, network scaling may alternatively or additionally be addressed by IGPs by aggregation of network address prefixes. That is, a router carries network addresses in complete form (often referred to as "/32" addresses) for routers that are located within the same network area, and maintains aggregated network address prefixes (i.e., less than full network addresses, such as "/16" prefixes) to represent other areas within the network.

One mechanism for carrying network traffic through a network is Multi-protocol Label Switching (MPLS). MPLS works by prefixing a network packet with an MPLS header that contains a stack of one or more "labels." Label switching routers (LSRs) forward network traffic based on the labels carried by the packets. Using MPLS, the LSRs can distribute labels and establish paths through the network, i.e., Label Switched Paths (LSPs). An LSP defines a distinct path through the network to carry MPLS packets from a source device to a destination device. Each router along an LSP allocates a label and propagates the label to the closest upstream router along the path for subsequent affixing to network traffic to form MPLS packets to be forwarded along the path. LSRs along the path cooperatively perform MPLS operations to forward the MPLS packets along the established path. A short label associated with a particular LSP is initially affixed to packets that are to travel through the network via the LSP, and that label may be replaced with subsequent labels at each LSR along the path.

A label distribution protocol such as the Label Distribution Protocol (LDP) may be used for distributing labels and establishing LSPs within a network. Using LDP, for example, a router may output control-plane LDP label mapping messages to advertise a label to neighboring routers for subsequent use in sending traffic to a particular destination associated with the advertising router. In LDP, it is required that the label map message specify the complete network address for the destination as well as the MPLS label to be used to reach the destination. Moreover, the LSPs established by LDP must strictly follow the shortest paths defined by the IGP in the RIB. In other words, LDP is not utilized to specify additional paths through a network, but is instead a protocol for distributing labels to be used to forward traffic along the shortest paths as selected by the IGP routing protocol used by the LSR, such as the OSPF or IS-IS IGP routing protocols.

Further, LDP requires that network address specified in the LDP label mapping message exactly match a network addresses contained within the RIB maintained by the router. For example, for establishing MPLS LSPs across a network area, LDP messages carry labels for full (exact) loopback addresses (/32 for IPv4) of the destination. LDP requires that the full IP loopback address carried in the label mapping message exactly match an entry in an IP routing information base (RIB) of the label switching router receiving the label mapping message. Therefore, MPLS LSPs between LSRs in different IGP areas/levels are not established unless the specific (e.g., the exact /32 for IPv4) loopback addresses of all the LSRs are redistributed across all IGP areas. This generally requires "route leaking" between the LSRs (i.e, use of a routing protocol to the exchange of routing information that otherwise would not be exchanged) so that inter-area routes and network addresses are "leaked" into the RIB of each LSR along the LSP. This can greatly expand the size of the RIB maintained by each of the LSR in order to support LDP across IGP areas (routing domains).

This can become a barrier to effective network scaling when an IGP is used across multiple areas. For example, use of LDP and MPLS forwarding would otherwise require LSRs within the network to maintain a large amount of routing state, which defeats much of the benefits of IGP scaling by way of hierarchical areas or levels. Moreover, many network service providers regard route leaking as a both a scalability issue as well as an operational problem.

SUMMARY

In general, techniques are described for extending a label distribution protocol to allow for scaling within networks using the label distribution protocol. For example, the techniques allow for scaling the label distribution protocol in a network that is hierarchically scaled using a plurality of hierarchically arranged interior gateway protocol (IGP) areas, e.g., OSPF areas or IS-IS levels. In accordance with the principles of the invention, a label distribution protocol has been extended to enable a router to create a hierarchical label mapping message containing at least two labels: (1) a primary label to be used for forwarding network traffic to the router, and (2) one or more secondary labels to be used for forwarding network traffic to destinations within a different IGP area (i.e., different IGP routing domains) of the network. The primary label and corresponding full network address (e.g., /32 loopback address) of the router may be carried in a required label field of the label mapping message, and the secondary label and the corresponding full destination network address within a different IGP routing domain may be carried within a separate optional field of the label mapping message. The router may advertise the labels by sending the hierarchical label mapping message to neighboring routers.

For example, an area border router may create and output a hierarchical label mapping message to hierarchically carry one or more labels for corresponding destinations in different areas within the optional field of the hierarchical label mapping message, while advertising another label and the loopback address of the area border router within the required label field of the hierarchical label mapping message. In this manner, the area border router need not send separate label mapping messages for advertising each of the labels for each of the corresponding destinations in the separate areas, but can instead hierarchically nest this information within a single hierarchical label mapping message. The area border router may output a single hierarchical label mapping message that has a label mapping for each router in a given area subtending from the area border router. The area border router may therefore send fewer label mapping messages overall, resulting in better scaling in the control plane of the area border router.

In addition, routers receiving the hierarchical label mapping message may fully process the contents of the hierarchical label mapping message to obtain both the primary label and the secondary label and install corresponding forwarding state, or may only partially process the contents to obtain and install only the primary label. For example, if a router has no need to reach the destination network address associated with the secondary label(s), the router need not create forwarding state for the secondary label(s). The techniques described herein therefore may improve control plane scaling with respect to the amount of control plane processing that is needed. In addition, the techniques allow for better scaling in the data plane, since a router may, by policy, install only what data plane state it needs from the received hierarchical label mapping message. In this way, some intermediate routers need not fully process the secondary label or even understand the meaning of the secondary label carried within the hierarchical label mapping message, and may treat the label mapping message like a conventional label mapping message and ignore the secondary label. Further, for LSPs between LSRs residing in different IGP routing domains, at least some of the intermediate label-switched routers along the LSP need no longer maintain an IGP RIB that contains all of the full network addresses (e.g., /32 IPv4 addresses) for all LSRs along the inter-domain LSP. In this manner, a label distribution protocol may be used to establish LSPs spanning multiple IGP routing domains in an IGP-scaled network without significantly impacting the scalability of IGP.

Moreover, the extensions to a label distribution protocol may enable a router receiving a single hierarchical label mapping message to install forwarding state that (1) identifies the primary label to be used for forwarding network traffic to an intermediate router; and (2) identifies a two-label stack comprising the first label as an outer label and the secondary label as an inner label to be used for forwarding network traffic to a destination router within a separate IGP routing domain (area) of the network. In this manner, scaling with the label distribution protocol may be performed by routers in an IGP-scaled network.

In one embodiment, a label distribution protocol such as the Label Distribution Protocol (LDP) has been extended to create a hierarchical label mapping message containing a required portion comprising one or more mandatory type-length-value (TLV) fields, such as a label TLV and a FEC TLV, and an optional portion comprising a newly defined optional type-length-value (TLV) field, referred to as a label mapping TLV. The label mapping TLV may recursively encode one or more sub-TLVs that each indicates a label and corresponding loopback address to which the advertising LSR has LDP connectivity. The label mapping TLV may be viewed as recursively encoded in that each of the sub-TLVs are arranged in a tree-like hierarchical order from one or more parent sub-TLVs to one or more child sub-TLVs. An LSR receiving the message can rely on being able to reach a destination specified in a sub-TLV at any point within the recursive encoding using a label stack consisting of a label specified within the required label TLV and those labels defined by sub-TLVs arranged in the tree-like hierarchical order between one of the parent sub-TLVs and that sub-TLVs containing the destination to be reached. Alternatively, the optional portion may comprise a sub-TLV nested within a value field of the label TLV.

The techniques described herein may provide one or more advantages. For example, the techniques described herein may allow backbone label switching routers (LSRs) within a backbone area of an IGP-scaled network to send only one label mapping message per backbone LSR in the backbone area. Backbone LSRs need only maintain LDP state and a RIB necessary to reach other backbone LSRs without requiring that LDP state and full network addresses be maintained for all LSRs along an inter-IGP routing domain LSP. Thus, the number of label mapping messages and the amount of state maintained by backbone routers may be significantly reduced. In addition, backbone LSRs need only partially process the label mapping messages, thereby reducing the amount of work the backbone LSRs need to do per message.

As explained, because LSPs established by LDP require exact matching of routes in the IGP, in some inter-autonomous system (AS) situations it may be necessary to leak /32 routes across IGP boundaries within the IGP RIB so that LDP can establish label bindings for forming provider edge-to-provider edge LSP tunnels across ASs. However, this route leaking to IGP in order to support LDP LSPs is regarded by many service providers as a scalability issue as well as a potential operational problem. The extensions to LDP described herein may avoid the need to leak full /32 addresses across IGP boundaries of a network, since the information from one AS necessary for establishing the inter-AS LSPs may be hierarchically carried within an optional field of a hierarchical label mapping message advertised to another AS and can be selectively disregarded by many of the intermediate LSRs along the LSP.

In this way, LDP and LDP-enabled LSRs need not be extensively modified in that LDP may be utilized to establish inter IGP-domain LSPs or inter-AS LSPs while still utilizing labels that are advertised with respect to full network addresses. The techniques described herein allow network aggregation to be used along with LDP label distribution without necessarily advertising labels for prefix network addresses (e.g., /16 network prefixes for IPv4) within a required portion of a label mapping message. For example, as described herein, full network addresses for a router in the same area of a network may be carried within the required portion of a hierarchical label mapping message. As a result, intermediate LSRs along the LSP that have not been modified so as to support the extensions described herein receive a full loopback address for a downstream border LSR along the LSP without necessarily being burdened with maintaining network addresses and link state routing information for all of the LSRs along the LSP. In addition, full network addresses may be used within the encoded sub-TLV's. The techniques described herein may also be used for setting up inter-domain point-to-multipoint (P2MP) LSPs.

Alternatively, one or more aggregated prefix network addresses for routers in other areas of the network may be hierarchically carried within a separate field of a hierarchical label mapping message. Receiving LSRs configured to process and utilize the encoded sub-TLVs (such as area border LSRs along the LSP) may be further configured to utilize a modified form of LDP that would only require that any network prefix encoded within the sub-TLVs match a network prefix within its RIB, thus dispensing with the strict requirement of a matching full network address. This may be achieved, for example, using techniques for summarization and longest-prefix match as described in U.S. Provisional Patent Application No. 61/114,782, entitled SUMMARIZATION AND LONGEST-PREFIX MATCH WITHIN MPLS NETWORKS, filed on Nov. 14, 2008, the entire contents of which are incorporated by reference herein. In this manner, with the extensions to LDP described herein, IGP scaling by way of hierarchical areas or levels as well as network address aggregation by use of network prefixes can be achieved.

Although described herein for exemplary purposes in reference to LDP, the principles may be applied to extend other protocols, such as other label distribution protocols. For example, the techniques could be applied to any protocol for distributing MPLS labels, and may be especially advantageous when the protocol is used to form inter-routing domain LSPs and requires complete network addresses for all LSRs along the LSP. As one example, the label distribution protocol may be the Resource Reservation Protocol (RSVP).

As one example, a method comprises receiving a label mapping message at an ingress router within a first routing domain of a network for establishing an inter-routing domain LSP, wherein the label mapping message identifies within a first portion of the label mapping message a first label to be used for forwarding network traffic to an intermediate router of the LSP, and identifies within a second portion of the label mapping message a second label to be used for forwarding network traffic to an egress router of the LSP within a second routing domain of the network. The method further comprises parsing the first portion and the second portion of the label mapping message to identify the first label and the second label, installing first forwarding state at the ingress router identifying the first label to be used for forwarding network traffic to the intermediate router, and installing second forwarding state at the ingress router identifying a two-label stack to be used for forwarding network traffic on the inter-routing domain LSP to the egress router, the two-label stack comprising the first label as an outer label and the second label as an inner label.

As a further example, a method for distributing labels for establishing an inter-domain LSP for forwarding network traffic comprises executing a routing protocol to maintain routing information for a first routing domain of a network partitioned into a plurality of routing domains, and receiving a label mapping message at a border router of the first routing domain, the label mapping message identifying a first label to be used for forwarding network traffic to a first egress router within a second one of the routing domains of a network. The method further comprises, with the border router, when a network address of the first egress router specified by the label mapping message matches a network address within the routing information, allocating a second label to advertise to neighboring routers in the first routing domain to be used for forwarding network traffic to the first egress router, and with the border router, allocating a third label to advertise to neighboring routers the first routing domain to be used for forwarding network traffic to the border router. The method further comprises generating a second label mapping message that includes at least both: (i) a required portion of the second label mapping message identifying the third label to be used for forwarding network traffic to the border router, and (ii) a separate optional portion identifying the second label to be used for forwarding network traffic to the first egress router, and advertising the second label mapping message to one or more neighboring routers within the first routing domain of the network.

A router comprises an interface configured to receive a label mapping message at an ingress router within a first routing domain of a network for establishing an inter-routing domain LSP, wherein the label mapping message identifies within a first portion of the label mapping message a first label to be used for forwarding network traffic to an intermediate router of the LSP, and identifies within a second portion of the label mapping message a second label to be used for forwarding network traffic to an egress router of the LSP within a second routing domain of the network. The router further comprises a control unit configured to the first portion and the second portion of the label mapping message to identify the first label and the second label, and forwarding information that associates network destinations with specific next hops and corresponding interfaces. The control unit is configured to install first forwarding state to the forwarding information identifying the first label to be used for forwarding network traffic to the intermediate router. The control unit is also configured to install second forwarding state to the forwarding information identifying a two-label stack to be used for forwarding network traffic on the inter-routing domain LSP to the egress router, the two-label stack comprising the first label as an outer label and the second label as an inner label.

A computer-readable medium contains instructions that cause a programmable processor to receive a label mapping message at an ingress router within a first routing domain of a network for establishing an inter-routing domain label switched path (LSP), wherein the label mapping message identifies within a first portion of the label mapping message a first label to be used for forwarding network traffic to an intermediate router of the LSP, and identifies within a second portion of the label mapping message a second label to be used for forwarding network traffic to an egress router of the LSP within a second routing domain of the network, parse the first portion and the second portion of the label mapping message to identify the first label and the second label, install first forwarding state at the ingress router identifying the first label to be used for forwarding network traffic to the intermediate router, and install second forwarding state at the ingress router identifying a two-label stack to be used for forwarding network traffic on the inter-routing domain LSP to the egress router, the two-label stack comprising the first label as an outer label and the second label as an inner label.

A network system comprises a computer network comprising a plurality of label switching routers, the label switching routers executing a routing protocol that partitions the computer network into a plurality of routing domains, each of the label switching routers maintaining routing information containing full network addresses for the routing domain in which the respective label switching router resides. The label switching routers execute a label distribution protocol to establish a label switched path that spans at least two of the routing domains, the label distribution protocol for at least one of the label switching routers requiring that network addresses advertised by label mapping messages of the label distribution protocol match the full network addresses of the routing information. At least a first one of the label switching routers in one of the routing domains outputs one of the label mapping messages to include at least: (i) a first MPLS label and a full network address for reaching the first one of the label switching routers, and (ii) one or more additional pairs of MPLS labels and corresponding network addresses for reaching network destinations within the other routing domains.

A method for distributing labels for establishing an inter-domain label switched path (LSP) for forwarding network traffic comprises executing, on a first label switching router, a routing protocol to maintain routing information for a first routing domain of a network partitioned into a plurality of routing domains. The method further comprises outputting a label mapping message to include at least: (i) a first MPLS label and a full network address of the first label switching router, and (ii) one or more additional pairs of MPLS labels and corresponding network addresses for reaching for reaching label switching routers in other the routing domains of the network. The additional pairs of MPLS labels and corresponding network addresses are encoded as one or more sub-fields of the label mapping message, the sub-fields being arranged in a tree-like hierarchical order from one or more parent sub-fields to one or more child sub-fields, and each network address specified by any sub-field within the tree-like hierarchical order being reachable using a label stack comprising the first MPLS label and those MPLS labels defined by sub-fields arranged in the tree-like hierarchical order between one of the parent sub-fields and the child sub-field containing the network address to be reached.

In a further embodiment, a method comprises receiving a label mapping message at an ingress router within a first routing domain of a network for establishing an inter-routing domain LSP, wherein the label mapping message identifies within a first portion of the label mapping message a first label to be used for forwarding network traffic to an intermediate router of the LSP, and identifies within a second portion of the label mapping message a second label to be used for forwarding network traffic to an egress router of the LSP within a second routing domain of the network. The method also comprises parsing the first portion and the second portion of the label mapping message to identify the first label and the second label, and presenting information relating to the LSP to a user, wherein the information includes the first label and the second label.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
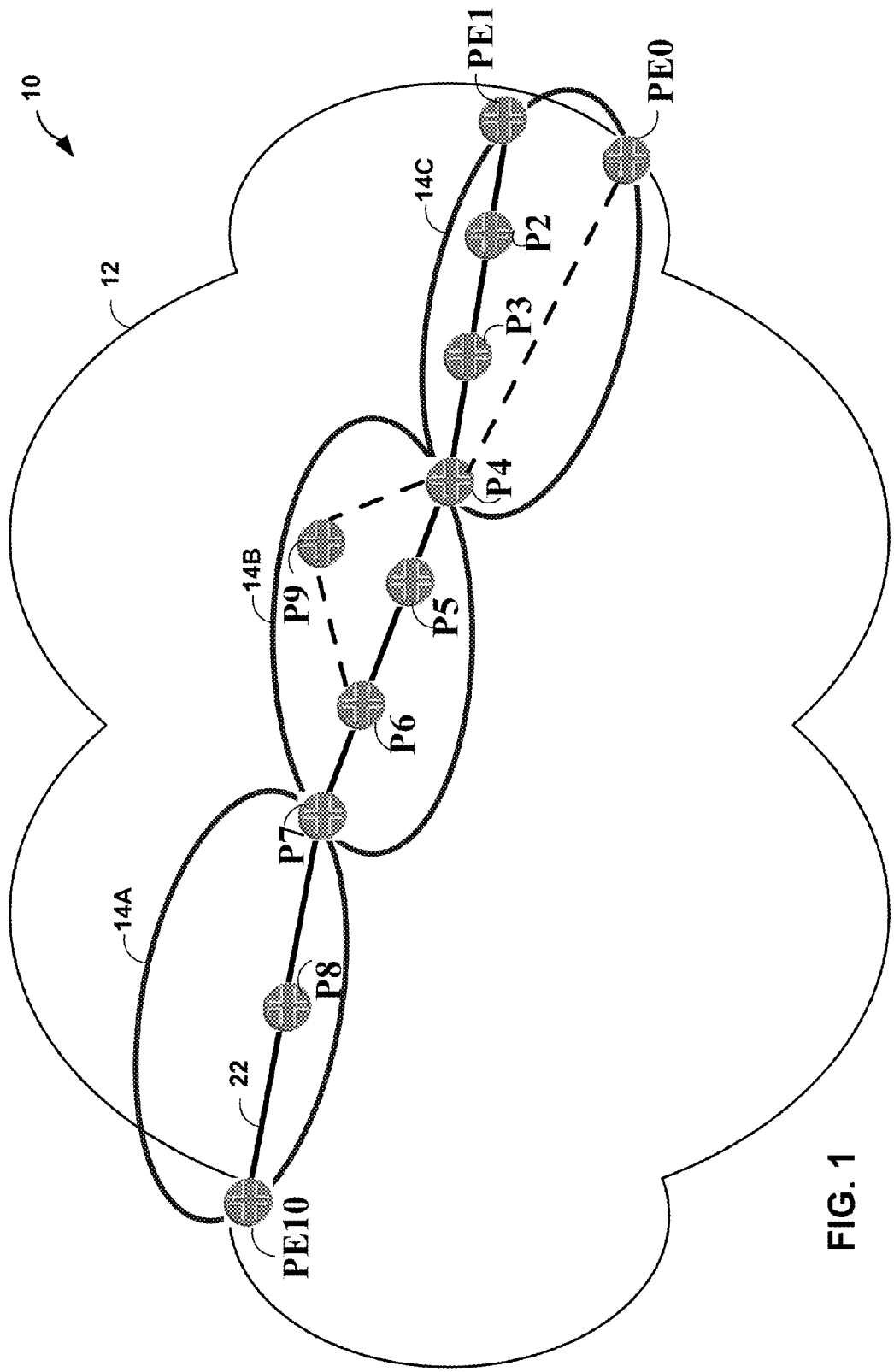
FIG. 1 is a block diagram illustrating an exemplary system having a computer network having a plurality of areas that include label switching routers (LSRs) that operate in accordance with an extended label distribution protocol as described herein.

FIG. 1 is a block diagram illustrating an exemplary system 10 having a computer network 12 (e.g., a service provider network 12) partitioned into a plurality of areas 14A-14C ("areas 14"). Each of areas 14 represents a distinct routing domain in that generally limited routing information is shared between the areas. Areas 14 may, for example, comprise separate routing domains such as Interior Gateway Protocol (IGP) hierarchical levels or areas so that network prefix information is shared between the levels or areas using the IGP routing protocol. As illustrated in FIG. 1, areas 14 include label switching routers (LSRs) PE0, PE1, P2-P9, and PE10 that operate in accordance with an extended label distribution protocol as described herein so as to establish LSPs. LSRs PE0, PE1, P2-P9, and PE10 maintain routing information that describes available routes through network 12. Upon receiving an incoming packet, the routers examine information within the packet and forward the packet in accordance with the routing information. In order to maintain an accurate representation of network 12, the routers exchange routing information in accordance with a defined routing protocol, such as an Interior Gateway Protocol (IGP).

Network 12 may be partitioned into hierarchical IGP areas 14 to facilitate routing scalability of network 12. For example, areas 14 may be Open Shortest Path First protocol (OSPF) areas or Intermediate System to Intermediate System protocol (IS-IS) levels. In this example, area 14B is a backbone area of network 12, and areas 14A and 14C are non-backbone areas of network 12. Network 12 may include additional non-backbone areas (not shown).

Provider edge (PE) routers (e.g., PE0, PE1, and PE10) are LSRs that are located on the edge of the network 12. The PE routers may have connectivity to other network devices in separate networks (not shown), such as customer edge devices or subscriber devices. The PE routers may provide the other network devices with access to network 12. Network 12 may comprise any public or private network or the Internet. Backbone routers (e.g., P4, P5, P6, P7, and P9) are LSRs that are located within backbone area 14B of network 12. Area border routers (ABRs) (e.g., P4 and P7) are LSRs that are located on a border of two or more areas 14 within the network.

LSRs distribute labels to neighboring LSRs within network 12 to support MPLS forwarding along routed paths within network 12. LSRs use a label distribution protocol such as the Label Distribution Protocol (LDP) for distributing labels and establishing label switched paths (LSPs) through network 12, such as inter-area LSP 22 that extends from PE10 in area 14A to PE1 in area 14C. In this example, LSRs use LDP label mapping messages to advertise labels to LDP peers for use in forwarding network traffic associated with a Forwarding Equivalence Class (FEC) to an identified destination. In other words, the label mapping messages advertise FEC-label bindings to the LDP peers.

As described herein, LSRs PE0, PE1, P2-P9, and PE10 within network 12 utilize a label distribution protocol such as LDP that has been modified as described herein to enable creation of hierarchical label mapping messages. The use of hierarchical label mapping messages allows for scaling in LDP. In other words, LDP may be used to distribute labels for an inter-area LSP 22 that spans multiple IGP routing domains without significantly burdening the scalability of IGP. As described herein, LDP has been extended to allow label mappings associated with non-backbone area 14C to be hierarchically nested within label mapping messages sent by ABR P4 within backbone area 14B. Stated more generally, label mappings for LSRs in a first area may be hierarchically nested within label mapping messages sent by an ABR on a border of the first area and a second area to LSRs within the second area. Example operation of LSRs within network 12 in creating, sending, and receiving hierarchical label mapping messages will be described in further detail below with respect to FIG. 2.

In general, LDP uses control plane messages exchanged between LSRs to associate a FEC with each LSP it creates. The FEC specifies a set of packets that are 'mapped' to that LSP. LDP uses a Type-Length-Value (TLV) encoding scheme to encode certain information carried in LDP messages. For example, label mapping messages include certain required TLVs, such as a FEC TLV that specifies the FEC component of the FEC-label mapping being advertised, and a label TLV that specifies the label component of the FEC-label mapping. In accordance with one example embodiment, LDP has been extended to define an additional optional label mapping TLV. The label mapping TLV may be used by an ABR to carry a FEC-label mapping for one or more destinations.

For example, one or more sub-TLVs for each non-backbone LSR subtending on the ABR may be nested within a value field of the label mapping TLV. In another embodiment, LDP may be extended to define an optional label mapping sub-TLV within a value field of the required label TLV, and one or more sub-sub-TLVs may be nested within a value field of the label mapping sub-TLV. In a further embodiment, LDP may be extended to allow separate optional label mapping TLVs for each non-backbone LSR subtending on the ABR, instead of nesting sub-TLVs within a single label mapping TLV.

In a conventional "flat" network hierarchy without scaling, every LSR within a network maintains a RIB that contains complete addressing information for every other LSR within the network. This information within the RIB may be voluminous as the network grows, but can be reduced or avoided by use of IGP scaling and partitioning of IGP routing domains so as to utilize network prefixes. However, conventional LDP requires that an LSR receiving an LDP label mapping message from a downstream LSR for a prefix should not use the advertised label for forwarding unless the receiving LSR's RIB contains an entry that exactly matches the FEC Element specified in the message. Therefore, MPLS LSPs between LSRs in different IGP areas/levels are not established unless the specific (e.g. the exact /32 for IPv4) loopback addresses of all the LSRs are redistributed across all IGP areas. This generally requires "route leaking" so that inter-area routes and network addresses are "leaked" across the IGP boundaries of network and stored within the RIB of each LSR along the LSP, thus greatly expanding the size of the RIB maintained by each of the LSR. Thus, use of LDP and MPLS forwarding would otherwise require LSRs within the network to maintain a large amount of routing state.

However, the use of hierarchical label mapping messages as described herein may require less IGP routing state and overall processing within network 12, particularly for LSRs within backbone area 14B. In addition, the use of hierarchical label mapping messages may require LSRs within network 12 to send fewer label mapping messages. An ABR, such as P4, may create and output a hierarchical label mapping message to hierarchically carry one or more labels and full loopback addresses for corresponding destinations in different IGP routing domain areas 14 within a separate optional field of the hierarchical label mapping message, while advertising another label and the full loopback address of ABR P4 within a required label field of the hierarchical label mapping message. In this manner, ABR P4 need not send separate label mapping messages for advertising each of the labels for each of the corresponding destinations in the separate areas, but can instead hierarchically nest this information within a single hierarchical label mapping message. ABR P4 may output a single hierarchical label mapping message that has a label mapping sub-TLV for each non-backbone LSR subtending from ABR P4. ABR P4 may therefore need to send fewer label mapping messages.

In this way, LDP and LDP-enabled LSRs need not be extensively modified in that LDP may be utilized to establish inter IGP-domain LSPs or inter-AS LSPs while still utilizing labels that are advertised with respect to full network addresses. The techniques described herein allow network aggregation to be used along with LDP label distribution without necessarily advertising labels for prefix network addresses (e.g., /16 network prefixes for IPv4) within a required portion of a label mapping message. For example, as described herein, full network addresses for a router in the same IGP area of a network may be carried within the required portion of a hierarchical label mapping message. As a result, intermediate LSRs along the LSP that have not been modified so as to support the extensions described herein receive a full loopback address for a downstream border LSR along the LSP without necessarily being burdened with maintaining network addresses and link state routing information for all of the LSRs along the LSP. In addition, full network addresses may be used within the encoded sub-TLV's.

Alternatively, one or more aggregated prefix network addresses for routers in other areas of the network may be hierarchically carried within a separate optional field of a hierarchical label mapping message. For example, loopback addresses of non-backbone LSRs of area 14C may be aggregated by using a network prefix (e.g., /8 or /16 for IPv4) for further routing scalability. If loopback addresses of non-backbone LSRs of area 14C are aggregated, ABR P4 may aggregate sub-TLVs in a label mapping TLV of a hierarchical label mapping message. For example, ABR P4 may use a prefix address in a single sub-TLV in the label mapping TLV to advertise labels to be used for forwarding traffic to any of a plurality of destinations in area 14C having loopback addresses within the prefix address. This may result in a smaller hierarchical label mapping message, because only a single sub-TLV is required instead of individual sub-TLVs for each full loopback address. Upstream LSRs receiving the label mapping message configured to process and utilize the encoded sub-TLVs (such as area border LSRs along the LSP) can be further configured to utilize a modified form of LDP that would only require that any network prefix encoded within the sub-TLVs match a network prefix within its RIB, thus dispensing with the strict requirement of a matching full network address. In this manner, with the extensions to LDP described herein, IGP scaling by way of hierarchical domains, areas, or levels as well as network address aggregation by use of network prefixes can be achieved.

In addition, the use of hierarchical label mapping messages means that backbone LSRs such as P5, P6, and P9 need only process label mapping messages from other backbone LSRs, instead of having to process label mapping messages separately propagated from each LSR in network 12 and install state for each of the LSRs. A backbone LSR only needs LDP state to reach other backbone LSRs, since ABRs will have LDP state necessary to reach those non-backbone LSRs (i.e., LSRs in non-backbone areas) subtending from the ABRs. Thus, when a backbone LSR receives a hierarchical label mapping message from another backbone LSR, it need only apply minimal processing of the label mapping TLV, as described in further detail below, and need not install state to reach the non-backbone LSRs. This may reduce the amount of routes that must be "leaked" across the IGP boundaries and stored within the RIB of each of the backbone LSRs in order to support the full network addresses of the LSRs along LSP 22. In this way LDP can be deployed and utilized even though not all of the intra-domain LSRs are exposed to the backbone LSRs and remain hidden by the IGP areas 14. As a result, the IGP routes maintained by the backbone LSRs can be reduced even though LDP was utilized to establish the inter-area LSP 22.

Moreover, non-backbone LSRs such as P2, P3, and P8, only need to output and process one label mapping message per backbone LSR or non-backbone LSR in the respective area 14A or 14C. As a result, in one embodiment the non-backbone LSRs P2, P3, and P8 only maintain LDP state for LSRs in their own area and for backbone LSRs.

End PEs such as PE0, PE1, and PE10 will process the label mapping TLVs and install data plane forwarding state. The end PEs may decide in accordance with a policy to install only needed data plane forwarding state from a received hierarchical label mapping message. The use of such a policy in combination with the techniques described herein may cause the end PEs to have significantly less forwarding state installed than otherwise would be the case.

Although described for purposes of example in terms of hierarchical IGP areas within a network, the techniques described herein may readily be applied to other situations, such as for establishing provider edge-to-provider edge tunnels across multiple autonomous systems (ASs). For example, the extensions to LDP described herein may allow for routes from one AS to be hierarchically carried within an optional field of a hierarchical label mapping message advertised to another AS. This may reduce the amount of route leaking from BGP or other border routing protocol to IGP in order to support inter-AS LSPs using LDP.

Figure 2:
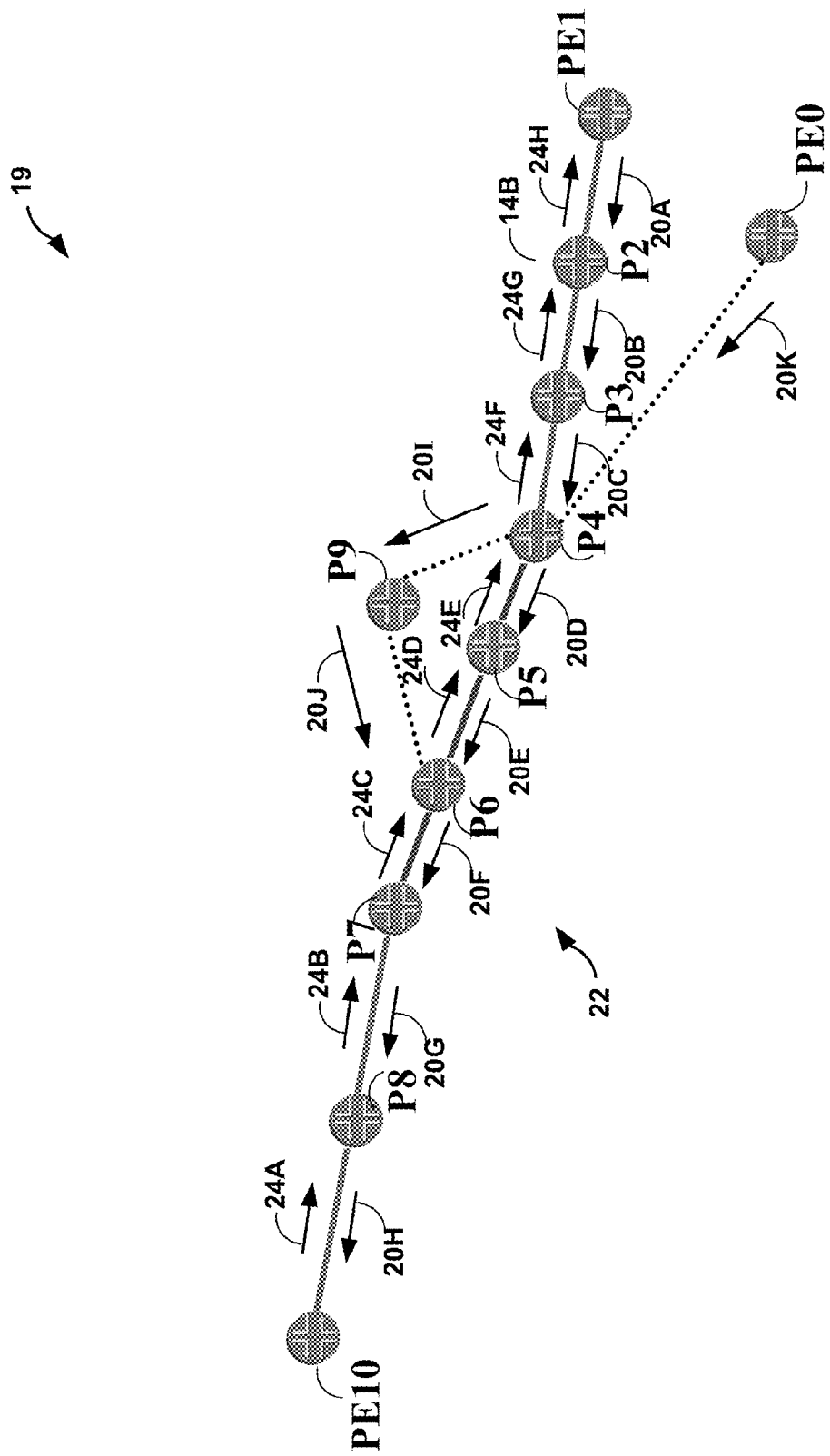
FIG. 2 is a block diagram illustrating in further detail a portion of the system of FIG. 1 in further detail.

FIG. 2 is a block diagram illustrating a portion 19 of example system 10 of FIG. 1 in further detail. As illustrated in FIG. 2, LSRs PE0, PE1, P2-P9, and PE10 of network 12 generate and output control-plane label mapping messages 20A-20K ("label mapping messages 20") to distribute MPLS labels, e.g., using the LDP protocol. The LSRs may establish inter-area LSP 22 extending between PE10 and PE1 through network 12 based on the label mapping messages 20.

For example, PE router PE1 may advertise a label mapping message 20A that maps a label L1 to a loopback network address for PE1. PE1 advertises label mapping message 20A to P2 for use in forwarding MPLS traffic destined for PE1 along LSP 22 between PE10 and PE1. LSR P2 receives label mapping message 20A. Provided the loopback network address for PE1 matches its IGP RIB, LSR P2 allocates a label L2 and installs forwarding state indicating that when LSR P2 receives a packet having label L2, the forwarding plane is to swap label L1 for label L2 and output the packet, bearing label L1, to PE1. LSR P2 creates a label mapping message 20B that maps label L2 to the loopback address for PE1, and outputs label mapping message 20B to LSR P3.

LSR P3 receives label mapping message 20B from LSR P2 and performs similarly to LSR P2, by allocating a label L3 and installing state indicating that when LSR P3 receives a packet having label L3, to swap label L2 for label L3, and output the packet, bearing label L2, to P2. LSR P3 creates a label mapping message 20C that maps label L3 to the loopback address for PE1, and outputs the label mapping message 20C to ABR P4.

When ABR P4 receives label mapping message 20C, ABR P4 recognizes that it is an area border router on the border of area 14C and area 14B, and recognizes that the label mapping message 20C is for establishing an LSP 22 that extends across areas 14B and 14C. ABR P4 allocates a label L4 to be mapped to the loopback address for PE1. ABR P4 also allocates a label L4' to be mapped to the loopback address for P4 (i.e., P4's own loopback address). ABR P4 installs forwarding state indicating that when ABR P4 receives a packet having a two-label stack with an outer label of L4' and an inner label of L4 to pop label L4' and swap label L3 for label L4, and output the packet, bearing label L3, to P3. ABR P4 also installs forwarding state indicating that when ABR P4 receives a packet having a single-label stack with a label of L4' to pop label L4' and process the packet.

According to one embodiment, ABR P4 uses LDP as extended herein to create a label mapping TLV that includes a sub-TLV that maps label L4 to the loopback address for PE1. ABR P4 may store a copy of the label mapping TLV within an LSP data structure of ABR P4 for future reference. ABR P4 creates a hierarchical label mapping message 20D having required TLVs (e.g., a label TLV and a FEC TLV) that maps label L4' to the loopback address for P4. P4 includes the label mapping TLV that maps label L4 to the loopback address for PE1 as an optional TLV within the hierarchical label mapping message. ABR P4 outputs the hierarchical label mapping message 20D to P5. ABR P4 creates a similar hierarchical label mapping message 20I to advertise to P9.

In this manner, ABR P4 hierarchically nests a label mapping for sending packets destined for PE1 within a separate, optional label mapping TLV of a label mapping message. Hierarchical label mapping message 20D may therefore be conventionally parsed to access only the mandatory label and FEC TLVs, or may be further parsed to access the nested sub-TLV within the label mapping TLV, depending on the capability and needs of the recipient.

For example, backbone LSR P5 receives hierarchical label mapping message 20D from ABR P4. Backbone LSR P5 needs to know how to reach backbone ABR P4 within the same area 14B, but does not need to know specifically the full network address of PE1 within area 14C since IGP scalability is being employed. Therefore, in one embodiment backbone LSR P5 may parse hierarchical label mapping message 20D to decode and process the label TLV and FEC TLV but may ignore the additional label mapping TLV. In another embodiment, LSR P5 may also decode the label mapping TLV but without fully processing the label mapping TLV as further described below. Provided the network address for P4 matches an entry in its RIB, P5 allocates a label L5' and installs state indicating that when P5 receives a packet having an outer label L5' to swap label L4' for label L5', and output the packet, bearing label L4', to P4. As P5 ignores the additional label mapping TLV, the RIB maintained by P5 need not store full network address for PE1, thus reducing the number of routes that would otherwise need to be leaked across IGP partitions of the network. P5 also creates a hierarchical label mapping message 20E that maps label L5' to the loopback address for P4 and also includes the same label mapping TLV as received in hierarchical label mapping message 20D (having sub-TLV mapping label L4 to the loopback address for PE1). P5 outputs the hierarchical label mapping message 20E to the router on the IGP best path to PE10, e.g., P6.

Backbone LSR P6 receives label mapping message 20E from backbone LSR P5 and performs similarly to backbone LSR P5 by allocating a label L6' and installing forwarding state indicating that when P6 receives a packet having an outer label L6' to swap label L5' for label L6', and output the packet, bearing label L5', to P5. As with P5, P6 may ignore the label mapping TLV within received label mapping message 20E or may only partially process the label mapping TLV. In this way, like P5, route leaking can be avoided and the RIB maintained by P6 can reduced from conventional size even though LDP has been used to establish the inter-area LSP. P6 creates a hierarchical label mapping message 20F that maps label L6' to the loopback address for P4 and also includes the same label mapping TLV as received in hierarchical label mapping message 20E (having sub-TLV mapping label L4 to the loopback address for PE1). P6 outputs the hierarchical label mapping message 20F to the router on the IGP best path to PE10, e.g., ABR P7.

ABR P7 receives label mapping message 20F, allocates a label L7', and installs state indicating that when P7 receives a packet having an outer label L7' to swap label L6' for label L7', and output the packet, bearing label L6', to P6. As with P5 and P6, P7 may ignore the label mapping TLV within received label mapping message 20F or may only partially process the label mapping TLV. In this way, like P5 and P6, route leaking can be avoided and the RIB maintained by P7 can reduced from conventional size even though LDP has been used to establish the inter-area LSP. P7 creates a hierarchical label mapping message 20G that maps label L7' to the loopback address for P4 and also includes the same label mapping TLV as received in hierarchical label mapping message 20F (having sub-TLV mapping label L4 to the loopback address for PE1). P7 outputs the hierarchical label mapping message 20G to non-backbone LSR P8.

Non-backbone LSR P8 receives label mapping message 20G, allocates a label L8', and installs state indicating that when P8 receives a packet having an outer label L8' to swap label L7' for label L8', and output the packet, bearing label L7', to P7. P8 may ignore the label mapping TLV within received label mapping message 20G or may only partially process the label mapping TLV. P8 creates a hierarchical label mapping message 20H that maps label L8' to the loopback address for P4 and also includes the same label mapping TLV as received in hierarchical label mapping message 20G (having sub-TLV mapping label L4 to the loopback address for PE1). P8 outputs the hierarchical label mapping message 20H to end LSR PE10. PE10 receives label mapping message 20H from P8 for establishing LSP 22. PE10 knows that it is the end router for LSP 22. PE10 needs to know how to get to PE1, so in accordance with the extensions to LDP, PE10 decodes the standard TLVs within label mapping message 20H as well as the optional label mapping TLV. Based on the contents of the standard TLVs, PE10 knows how to send packets to P4, and based on the contents of the label mapping TLV, PE10 knows how to send packets to PE1 via P4. PE10 installs first forwarding state that instructs for packets needing to reach P4, use label L8'. PE10 installs second forwarding state that instructs for packets needing to reach PE1, use a two-label stack consisting of an outer label L8' and an inner label L4. In other words, using the label mapping TLV, PE10 can apply a two-label stack having an outer label L8' that will ensure the packet gets to P4, and an inner label L4 that P4 will then use to ensure the packet gets to PE1.

When PE10 receives a packet destined for PE1, PE10 will access its forwarding state and forward the packet along LSP 22 to P8 as packet 24A having the two-label stack (outer label L8', inner label L4). P8 receives packet 24A, swaps outer label L8' for label L7', and forwards the packet to P7 as packet 24B having a two-label stack (outer label L7', inner label L4). P7 receives packet 24B, swaps outer label L7' for label L6', and forwards the packet to P6 as packet 24C having a two-label stack (outer label L6', inner label L4). P6 receives packet 24C, swaps outer label L6' for label L5', and forwards the packet to P5 as packet 24D having a two-label stack (outer label L5', inner label L4). P5 receives packet 24D, swaps outer label L6' for label L4', and forwards the packet to P4 as packet 24E having a two-label stack (outer label L4', inner label L4).

P4 receives packet 24E, pops (removes) outer label L5', swaps inner label L4 for label L3, and forwards the packet to P3 as packet 24F having a single-label stack (label L3). P3 receives packet 24F, swaps inner label L3 for label L2, and forwards the packet to P2 as packet 24G having a single-label stack (label L2). P2 receives packet 24G, swaps inner label L2 for label L1, and forwards the packet to PE1 as packet 24H having a single-label stack (label L1). PE1 receives packet 25H, pops label L1, and processes packet 25H. In this manner, packets are sent from PE10 to PE1 along LSP 22.

In addition, PE0 may send label mapping message 20K to P4. Upon receiving label mapping message 20K, P4 updates its stored label mapping TLV to include an additional sub-TLV having the information contained within label mapping message 20K, in addition to the sub-TLV having the information contained within label mapping message 20C. P4 may then send new hierarchical label mapping messages 20D and 20I to advertise the newly updated label mapping TLV. Similarly, if for example P3 later sends a label withdraw message withdrawing label L3, P4 may also update the label mapping TLV to remove the sub-TLV with the mapping for label L3, and advertise updated hierarchical label mapping messages to neighboring LSRs.

The techniques may also be applied to include multiple layers of hierarchy for multiple IGP areas. For example, P7 is an ABR on the border of areas 14A and 14B. In some embodiments, when advertising a hierarchical label mapping message to LSRs within area 14A, P7 may hierarchically nest all of the labels received from LSRs in area 14B within a label mapping TLV and nested sub-TLVs of the hierarchical label mapping message.

LSRs may also apply Equal Cost Multipath (ECMP) routing principles to forward packets on a plurality of equal cost paths to another LSR consistent with the extensions to LDP described herein. For example, in network 12, two paths may exist from P6 to P4: (1) P6-P5-P4, and (2) P6-P9-P4. Backbone router P6 may receive hierarchical label mapping messages 20E and 20J from P5 and P9, respectively. If the IGP cost from P6 to P4 is the same via P5 or P9, then P6 may apply ECMP routing principles to forward packets to P4 by applying either label L5' or L10' to packets on LSP 22. To do this, upon receiving a hierarchical label mapping message from P5 or P9, P6 may parse the optional label mapping TLV of the received hierarchical label mapping messages to determine whether the sub-TLVs in the label mapping TLV are the same in the hierarchical label mapping messages received from both P5 and P9. If the sub-TLVs in the label mapping TLVs are the same, then P6 may use either one of the label mapping TLVs when advertising a hierarchical label mapping message 20F to P7. If the sub-TLVs in the label mapping TLVs are not the same, then P6 may use the label mapping TLV that was most recently received. Other than comparing the sub-TLVs, however, P6 may not need to further process the label mapping TLV of received hierarchical label mapping messages or install forwarding state for the label mapping TLVs. LSRs not employing ECMP may not even need to parse the label mapping TLV upon receiving a hierarchical label mapping message.

Figure 3:
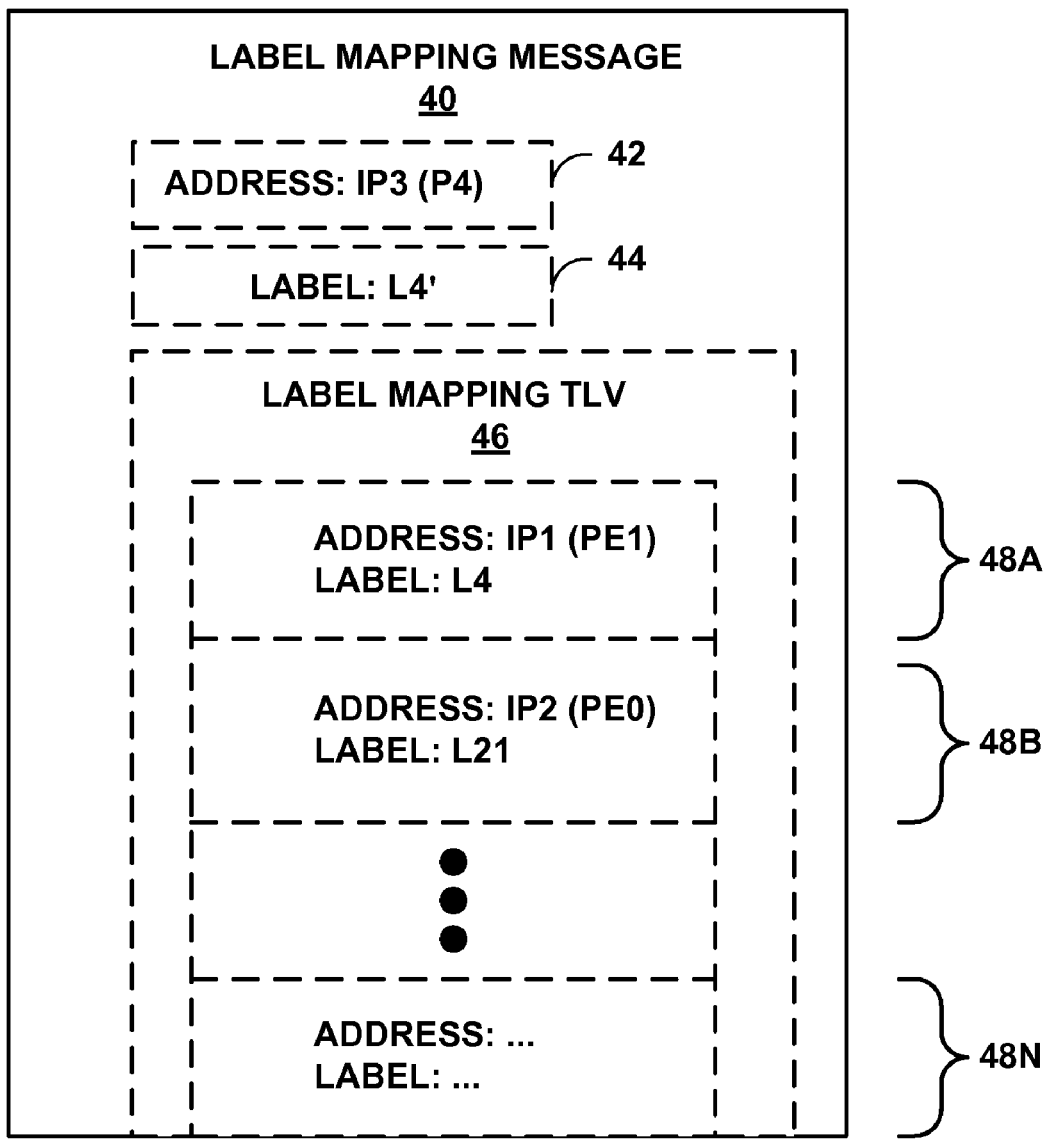
FIG. 3 is a block diagram illustrating an exemplary format of a hierarchical label mapping message that may be advertised by an LSR using extensions to the label distribution protocol as described herein.

FIG. 3 is a block diagram illustrating an exemplary format of a hierarchical label mapping message 40 that may be advertised by an LSR using extensions to LDP as described herein. For example, hierarchical label mapping message 40 may be a label mapping message such as hierarchical label mapping message 20D generated by ABR P4 (FIG. 2).

In the example of FIG. 3, hierarchical label mapping message 40 includes a FEC TLV 42 and a label TLV 44 as in conventional LDP label mapping messages. FEC TLV 42 and label TLV 44 comprise a portion of hierarchical label mapping message 40 required by the conventional LDP protocol. In accordance with the extensions to LDP described herein, hierarchical label mapping message 40 also includes a newly defined optional label mapping TLV 46, which has one or more sub-TLVs 48A-48N that may be recursively processed by any LSR receiving the message to any level necessary for that LSR. Label mapping TLV 46 comprises a separate, optional portion of hierarchical label mapping message 40. As generated by ABR P4, label mapping TLV 46 may include a sub-TLV for each non-backbone LSR subtending from ABR P4. ASR P4 may generate hierarchical label mapping message 40 in response to receiving an LDP message from an LDP peer, such as a label mapping message or a label withdraw message.

In accordance with the techniques described herein, these sub-TLVs allow recursive access to the addresses in the sub-TLV by means of label stacking. That is, the semantics for the newly defined label mapping message are such that any LSR receiving the message can rely on being able to reach a destination in a lower-level sub-TLV via the label stack that comprises the label contained within the higher-level sub-TLV followed by the label contained within that lower-level sub-TLV. This allows a hierarchical LDP label mapping message to be formed and advertised upstream by an LSR, where the message carries a complete loopback address (/32) for reaching the advertising LSR as well a set of nested sub-TLVs that carry complete loopback addresses for other destinations to with the LSR has LDP connectivity. Upstream routers can recursively traverse the sub-TLVs and utilize the nested LDP labels as necessary.

For example, with reference to FIG. 2, ABR P4 may receive a label mapping message 20C advertising a label mapping for reaching PE1, and ABR P4 may also receive a label mapping message 20K advertised a label mapping for reaching PE0. For example, label mapping message 20K maps a label L20 to a full loopback address for PE0, and label mapping message 20C maps a label L3 to a full loopback address for PE1. ABR P4 allocates label L4 to be mapped to the loopback address for PE1, and a label L21 to be mapped to the full loopback address for PE0. ABR P4 also allocates a label L4' to be mapped to the full loopback address for P4 (i.e., P4's own loopback address).

ABR P4 generates a label mapping TLV 46 to include sub-TLV 48A having the label L4 that is bound to a loopback address IPE1 for PE1, and a sub-TLV 48B having the label L21 that is bound to a loopback address IP2 for PE0. ABR P4 creates hierarchical label mapping message 40 having the label L4' mapping to a loopback address IP3 for P4, and having the label mapping TLV 46. Thus, instead of having to output three separate conventional label mapping messages into area 14B to transmit the same information (i.e., a label to use to get to P4, a label to use to get to PE0, and a label to use to get to PE1), ASR P4 can output the single hierarchical label mapping message 40 that advertises the label to use to get to ASR P4, and hierarchically nests in a separate field the labels to use to get to LSRs behind ASR P4 in area 14C.

Hierarchical label mapping message 40 may be larger than a conventional label mapping message 40, as it contains additional information. However, as described above, backbone routers within area 14B need not fully process the label mapping TLV 46 when receiving hierarchical label mapping message 40. Instead, a simple comparison may be performed to check whether sub-TLVs 48 within the label mapping TLV 46 match previously received sub-TLVs in a stored label mapping TLV. Also, to the extent such processing is necessary, backbone routers can process the sub-TLVs 48 in bulk by comparing all of the sub-TLVs 48 to corresponding sub-TLVs of a stored label mapping TLV 46.

ABR P4 may modify the label mapping TLV and re-send a new hierarchical label mapping message 40 when ABR P4 subsequently receives an LDP message from an LDP peer such as a label mapping message or a label withdraw message. For example, ABR P4 may add another sub-TLV 48 when a new label mapping message is received advertising a new loopback address, or ABR P4 may remove one of sub-TLVs 48 when a label withdraw message is received withdrawing a label for a loopback address associated with an existing one of sub-TLVs 48.

FIG. 3 illustrates one exemplary format for a hierarchical label mapping message, but as described above, other formats may be used consistent with this disclosure. For example, in another embodiment, LDP may be extended to define an optional label mapping sub-TLV within a value field of the required label TLV or other field defined by conventional LDP, and one or more sub-sub-TLVs may be nested within the label mapping sub-TLV. In a further embodiment, LDP may be extended to allow separate optional label mapping TLVs for each non-backbone LSR subtending on the ABR, instead of nesting a plurality of sub-TLVs within a single label mapping TLV.

Figure 4:
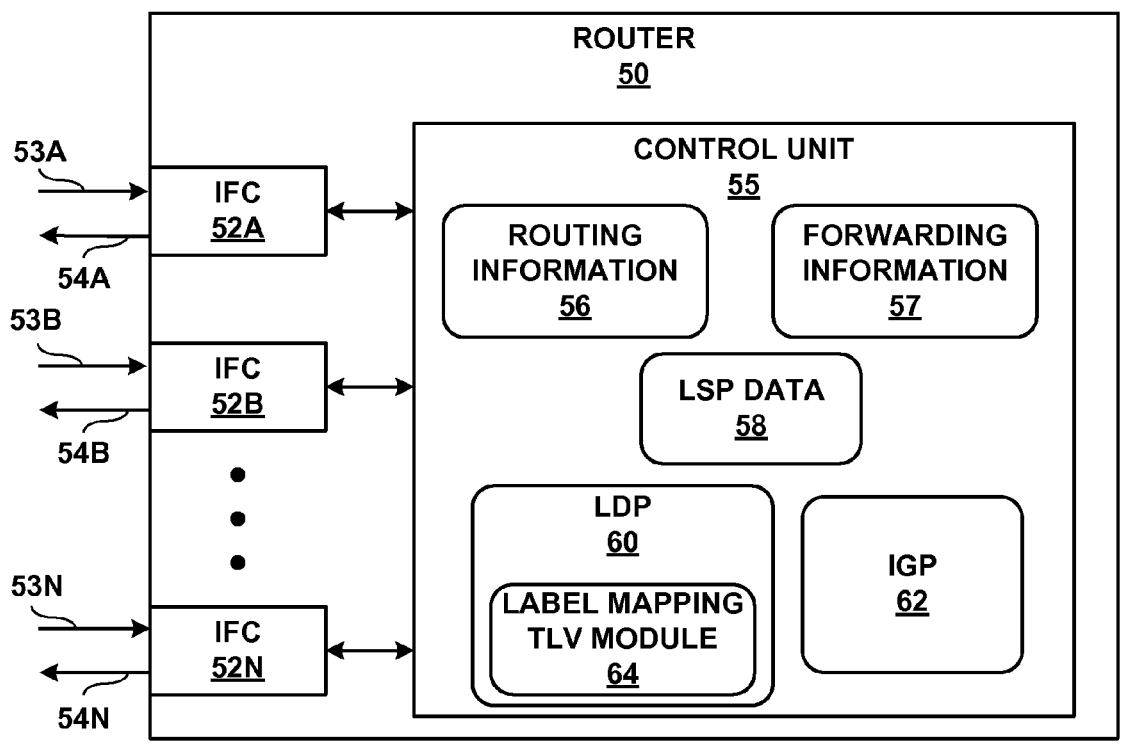
FIG. 4 is a block diagram illustrating an exemplary router that uses a protocol that has been extended as described herein to utilize hierarchical label mapping messages when establishing an LSP for forwarding network traffic across a plurality of IGP areas in a network.

FIG. 4 is a block diagram illustrating an exemplary router 50 that uses a protocol that has been extended as described herein to use hierarchical label mapping messages when establishing an LSP for forwarding network traffic across a plurality of IGP areas in a network. Router 50 may, for example, represent any of the routers described herein. As an example, router 50 may comprise an ingress router associated with the LSP (e.g., PE10 of FIG. 1), an egress router associated with the LSP (e.g., PE1), an area border router on the LSP (e.g., P4), an intermediate router on the LSP within a backbone area (e.g., P2), or an intermediate router on the LSP within a non-backbone area (e.g., P5).

Router 50 includes a set of interface cards (IFCs) 52A-52N ("IFCs 52") for communicating packets via inbound links 53A-53N ("inbound links 53") and outbound links 54A-54N ("outbound links 54"). Router 50 further comprises a control unit 55 that maintains routing information 56. Routing information 56 describes the topology of a network and, in particular, routes through the network. Routing information 56 may include, for example, route data that describes various routes within the network, corresponding next hop data indicating appropriate neighboring devices within the network for each of the routes. Router 50 updates routing information 56 to accurately reflect the topology of the network. In this manner, routing information 56 represents the RIB of router 50 and may be configured to leverage IGP scaling using network prefixes in the event the network is partitioned into multiple IGP routing domains. In this configuration, routing information 56 generally stores complete routing information and full network addresses for destinations located within the same IGP routing domain.

Control unit 55 also maintains forwarding information 57 that associates network destinations with specific next hops and corresponding interface ports. In general, forwarding information 57 may be installed within a forwarding plane of control unit 55 (e.g., a forwarding engine having a switch fabric) such that when router 50 receives a packet via one of inbound links 53, the forwarding plane determines a destination and associated next hop for the packet and forwards the packet on one of outbound links 54 to the corresponding next hop based on the destination of the packet.

In the example of FIG. 4, control unit 55 provides an operating environment for control plane processes including a label distribution protocol module 60 ("LDP 60") and IGP 62 executing within control unit 55. In other embodiments, other control plane protocols may be executed within control unit 55, such as the resource reservation protocol (RSVP). LDP 60 has been extended to support hierarchical label mapping messages and the LSP setup techniques described herein. Consistent with the principles of the invention, LDP 60 provides control plane signaling mechanisms for forming LSPs, including inter-area LSPs. In certain embodiments, the LSP setup operations may be carried out automatically, i.e., without intervention by a system administrator or a software agent.

LDP 60 receives label mapping messages from other routing devices on inbound links 53, allocates labels, and sends label mapping messages on outbound links 54. Although described herein for exemplary purposes in reference to LDP, the principles may be applied to extend other protocols, such as other label distribution protocols, for example the Resource Reservation Protocol (RSVP). LDP 60 maintains LSP data 58. Depending on the relation of router 50 to the LSP, LSP data 58 may store one or more FEC elements. In addition, LSP data 58 may store one or more labels allocated for the LSP, the relationships between FEC elements and labels, and the LSRs to which router 50 has sent the labels.

In accordance with the techniques of the invention, LDP 60 includes a label mapping TLV module 64 that may be used to define an additional optional label mapping TLV to be included within a hierarchical label mapping message generated by LDP 60. For example, in the event router 50 is an area border router (ABR) on the border of a backbone IGP area and a non-backbone IGP area, label mapping TLV module 64 may create a label mapping TLV to carry a FEC-label mapping for one or more destinations in the non-backbone area. For example, as described above, label mapping TLV module 64 may nest one or more sub-TLVs for each non-backbone LSR subtending on router 50 within an optional label mapping TLV of a hierarchical label mapping message, wherein the hierarchical label mapping message further includes a required label TLV and a required FEC TLV that contain a FEC-label mapping that maps a label to the loopback address for router 50. LSP data 58 may also store label mapping TLVs advertised within hierarchical label mapping messages.

Thus, router 50 may use hierarchical label mapping messages to hierarchically carry one or more labels for corresponding destinations in the non-backbone area within a separate optional field of the hierarchical label mapping message, while advertising another label and the loopback address of router 50 within a required label field of the hierarchical label mapping message. In this manner, router 50 need not send separate label mapping messages for advertising each of the labels for each of the corresponding destinations in the non-backbone area, but can instead hierarchically nest this information within a single label mapping message. Router 50 may then output the hierarchical label mapping message to neighboring LSRs within the backbone area.

In the event router 50 is an intermediate backbone router of the LSP being established, router 50 may or may not include label mapping TLV module 64. For example, router 50 may receive a hierarchical label mapping message from a neighboring LSR on a first path to an area border router. In some cases, router 50 may include label mapping TLV module 64 to allow router 50 to parse the label mapping TLV of the received hierarchical label mapping module in order to compare the label mapping TLV with a previously received label mapping TLV from a different neighboring LSR on a second path to the area border router. Router 50 may store the previously received label mapping TLV within LSP data 58, and may refer to LSP data 58 when performing the comparison.

If label mapping TLV module 64 determines that the label mapping TLVs contain identical information (e.g., the label mapping TLVs map the same labels to respective destinations), router 50 may include the same label mapping TLV in a hierarchical label mapping message by which router 50 advertises a label associated with its own loopback address. If label mapping TLV module 64 determines that the label mapping TLVs received from different neighboring LSRs are not identical, label mapping TLV module 64 may select the most recently received label mapping TLV to include in a hierarchical label mapping message by which router 50 advertises a label associated with its own loopback address. In cases in which router 50 does not include label mapping TLV module 64, router 50 may simply ignore the label mapping TLV in a received hierarchical label mapping message. Alternatively, the above comparison may be performed by a different module already present within router 50.

Moreover, in the event router 50 is an end router of an LSP being established, label mapping TLV module 64 may enable router 50, upon receiving a single hierarchical LDP label mapping message containing a label mapping TLV, to interpret the contents of the label mapping TLV and install forwarding state that (1) identifies a first label from the required label TLV to be used for forwarding network traffic to an intermediate router identified by the FEC TLV; and (2) identifies a two-label stack comprising the first label as an outer label and a label from the label mapping TLV as an inner label to be used for forwarding network traffic to a destination router within a separate area of the network according to the label mapping TLV.

A hierarchical label mapping message received by router 50 may include a label mapping TLV that has a plurality of sub-TLVs, each associated with a different destination in a different IGP area than router 50. Where router 50 is an end router of an LSP, router 50 may decide to install only what data plane state that router 50 needs from the plurality of sub-TLVs of the received hierarchical label mapping message. For example, router 50 may be configured with policies that indicate the destinations for which router 50 should have state installed. Based on the policies, router 50 may install forwarding state (e.g., different two-label stacks) associated with some of the sub-TLVs carried by the hierarchical label mapping message, and may ignore the remaining sub-TLVs.

In another example embodiment, the label distribution protocol may be RSVP. In the example of RSVP, RSVP may be extended to send hierarchical label map messages. The format of the hierarchical label map messages may be different than those described for LDP. For example, a hierarchical RSVP message may or may not include a required FEC TLV, since the FEC-label binding is already implicitly known for the RSVP LSP due to the nature of RSVP. Nonetheless, the label map messages in RSVP would have a similar effect of hierarchically carrying label mapping information.

The architecture of router 50 illustrated in FIG. 4 is shown for exemplary purposes only. The invention is not limited to this architecture. In other embodiments, router 50 may be configured in a variety of ways. In one embodiment, for example, control unit 55 and its corresponding functionality may be distributed within IFCs 52. In another embodiment, control unit 55 may include a routing engine that performs routing functions and maintains a routing information base (RIB), e.g., routing information 56, and a forwarding engine that performs packet forwarding based on a forwarding information base (FIB), e.g., forwarding information 57, generated in accordance with the RIB.

In addition, although illustrated in FIG. 4 as being implemented by a router 50, certain of the techniques described herein may also be applied by a network device that is not a router. For example, a network device may be deployed in the network for snooping network packets including MPLS packets, storing information learned from the MPLS packets regarding what labels are used for reaching destinations associated with LSPs, and presenting the information to a user. For example, the network device may build a table of information or build up Simple Network Management Protocol (SNMP) information, to be displayed to a user. In this embodiment, the network device may be configured with an extended version of LDP that allows the network device to, upon receiving a label mapping message (e.g., a hierarchical label mapping message), parse the hierarchical label mapping message to obtain the labels from the TLVs and the sub-TLVs. This network device may not install forwarding state, but may instead simply store and/or present the information obtained by snooping the MPLS packets.

Control unit 55 may be implemented solely in software, or hardware, or may be implemented as a combination of software, hardware, or firmware. For example, control unit 55 may include one or more processors that execute software instructions. In that case, the various software modules of control unit 55, such as LDP 60 and IGP 62, may comprise executable instructions stored on a computer-readable medium, such as computer memory or hard disk. Control unit 55 may store data structures on one or more computer-readable media, such as a magnetic medium, optical medium, non-volatile random access memory (NVRAM), dynamic random access memory (DRAM), FLASH memory, or the like.

Figure 5:
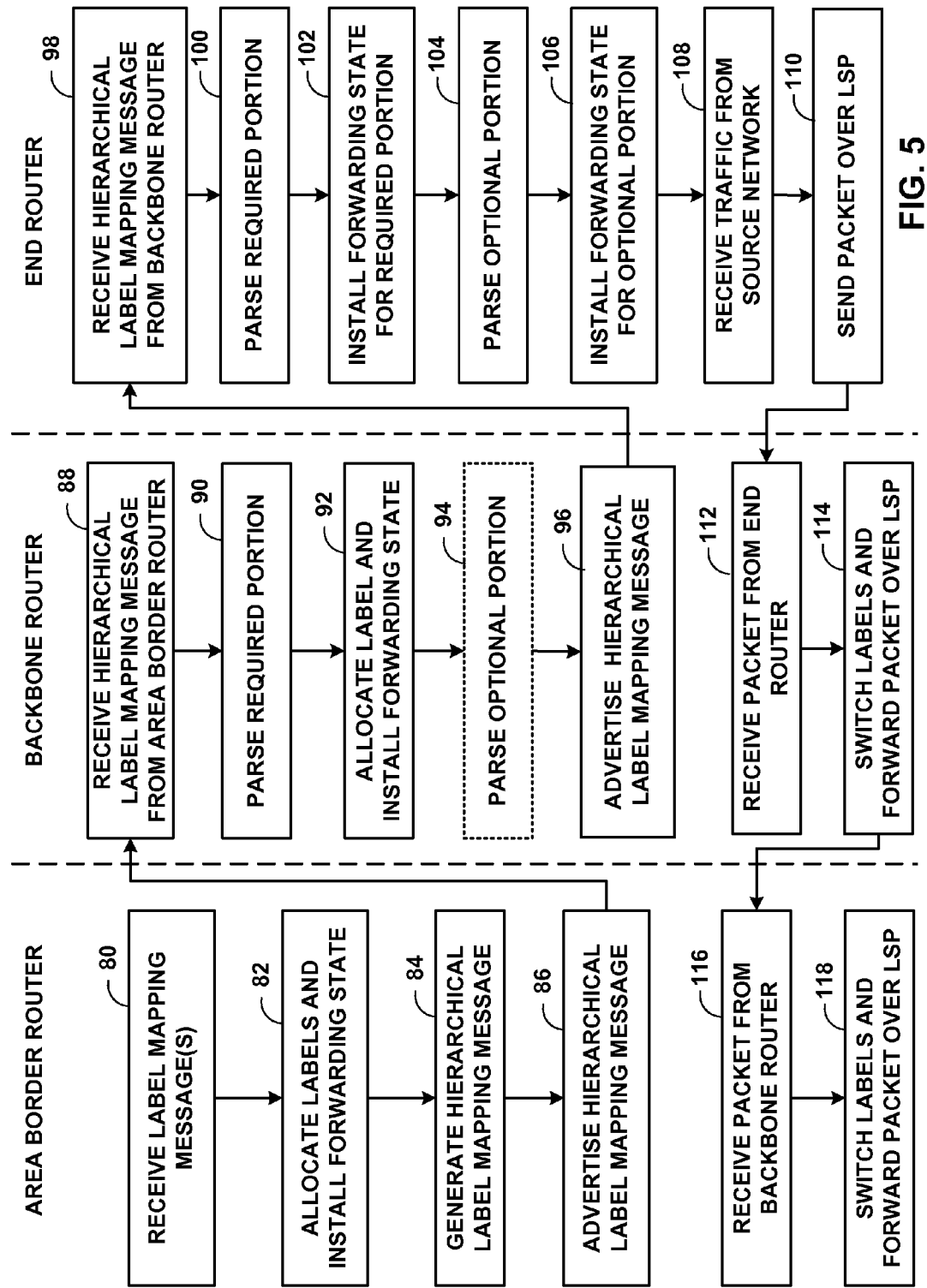
FIG. 5 is a flowchart illustrating exemplary operation of network devices in a computer network establishing an LSP and transmitting traffic across the established LSP using a protocol that has been extended as described herein to utilize hierarchical label mapping messages.

FIG. 5 is a flowchart illustrating exemplary operation of network devices in a computer network establishing an LSP and transmitting traffic across the established LSP. The network devices may comprise either an area border router (ABR) within an inter-area LSP, an intermediate router of the LSP, or an end router at the ingress of the LSP. The network devices may be substantially similar to router 50 illustrated in FIG. 4. For exemplary purposes, the process is described relative to a simplified version of network 12 illustrated in FIG. 1. In particular, the process is described relative to network devices PE1, area border router P4, intermediate backbone router P6, and end router PE10, and for simplification is discussed as though the other intermediate devices shown in FIGS. 1 and 2 were not present in network 12.

Network 12 includes LSP 22 extending from an ingress end router PE10 to an egress provider edge router PE1. PE1 initiates setup of LSP 22 in network 12. For example, PE1 advertises a label mapping message to ABR P4. ABR P4 receives the label mapping message from PE1 in area 14C, and may also receive one or more other label mapping messages from other LSRs in area 14C, such as PE0 (80). The received label mapping messages advertise labels to be used for sending packets to PE1 and PE0, respectively. ABR P4 recognizes that it is an area border router on the border of area 14C and area 14B. ABR P4 uses LDP 60 (FIG. 4) to allocate a label L4 to be mapped to the loopback address for PE1, a label L21 to be mapped to the loopback address for PE0, and a label L4' to be mapped to the loopback address for P4 (i.e., P4's own loopback address). This may require leaking of routes such that the RIB of ABR P4 specifies the full loopback addresses specified in labels L4 and L4'. ABR P4 installs forwarding state indicating the forwarding operations to be performed upon receiving packet having a two-label stack with an outer label of L4' and an inner label of L4 or L21 (e.g., pop the outer label and forward the packet toward the corresponding one of PE1 and PE0). ABR P4 also installs forwarding state to forwarding information 57 of P4 indicating operations to be performed upon receiving packet having a single label of L4' (e.g., process the packet at ABR P4) (82).

Label mapping TLV module 64 of ABR P4 creates a label mapping TLV that includes a first sub-TLV that maps label L4 to the loopback address for PE1, and a second sub-TLV that maps label L21 to the loopback address for PE0. ABR P4 generates a hierarchical label mapping message having required TLVs (a label TLV and a FEC TLV) that maps label L4' to the loopback address for P4. P4 includes the label mapping TLV with the two sub-TLVs as an optional TLV within the hierarchical label mapping message (84). ABR P4 advertises the hierarchical label mapping message to neighboring LSRs within area 14B, including intermediate backbone router P6 (86). In this manner, ABR P4 aggregates the multiple label mapping messages received into a single hierarchical label mapping message to be sent, rather than sending multiple individual label mapping messages.

Intermediate backbone router P6 receives the hierarchical label mapping message from ABR P4 (88). LDP 60 of backbone router P6 parses the required portion of the hierarchical label mapping message, i.e., the label TLV and the FEC TLV (90). LDP 60 may store the FEC-label mapping specified by the required portion in LSP data 58 (FIG. 4). In some embodiments, P6 may ignore the optional portion of the hierarchical label mapping message, i.e., the label mapping TLV. This may avoid leaking of routes to P6 such that the RIB of P6 may be reduced and need not specify the full loopback addresses for the LSRs along the LSP in other domains, namely the addresses specified in the optional portion of the hierarchical label mapping message. LDP 60 of backbone router P6 allocates a label to be advertised to neighboring LSRs and installs forwarding state to forwarding information 57 of P6 for forwarding packets towards ABR P4 along the LSP (92).

In some embodiments, backbone router P6 may optionally parse the optional portion of the received hierarchical label mapping message from ABR P4 (94). For example, as described above, if backbone router P6 applies ECMP routing principles, P6 may parse the label mapping TLV and compare the sub-TLVs to sub-TLVs of other hierarchical label mapping messages received on equal cost paths to determine which label mapping TLV to use in advertising a hierarchical label mapping message. In other embodiments, backbone router P6 may not parse the optional portion and may simply ignore the label mapping TLV and output a hierarchical label mapping message having the same label mapping TLV as the hierarchical label mapping message received from ABR P4. In any case, backbone router P6 advertises a hierarchical label mapping message to neighboring LSRs, including end router PE10 (96).

End router PE10 receives the hierarchical label mapping message advertised by backbone P6 (98). End router PE10 parses the required portion of the hierarchical label mapping message, i.e., the label TLV and the FEC TLV (100). LDP 60 of end router PE10 may store the FEC-label mapping specified by the required portion in LSP data 58 of end router PE10 (FIG. 4). End router PE10 installs forwarding state to forwarding information 57 associated with the required portion that instructs PE10 to use the label within the label TLV for forwarding traffic to P4 using an address specified within the FEC TLV (102).

Label mapping TLV module 64 of end router PE10 also parses the optional portion of the hierarchical label mapping message, i.e., the label mapping TLV (104). LDP 60 may store one or more FEC-label mappings specified by the label mapping TLV in LSP data 58 of end router PE10. End router PE10 installs forwarding state to forwarding information 57 associated with the optional portion that instructs PE10 to use a two-label stack for forwarding traffic to destinations in other areas according to the sub-TLVs (106). For example, the two-label stack for a given destination consists of an outer label from the label TLV of the required portion and an inner label from a sub-TLV for forwarding the packet to the destination from the sub-TLV. End router PE10 may install forwarding state for each of a plurality of sub-TLVs nested within the optional label mapping TLV. In this manner, LSP 22 is established for forwarding network traffic across areas 14A-14C.

End router PE10 at the ingress of LSP 22 subsequently receives traffic from a source network to be forwarded to end router PE1 over LSP 22 (108). End router PE10 refers to forwarding information 57 and forwards a packet having a two-label stack on LSP 22 in accordance with the installed forwarding information 57 (110). Backbone router P6 receives the packet from end router PE10 (112). Backbone router P6 looks up the outer label of the packet in forwarding information 57 of P6, swaps the outer label for another label based on the forwarding information 57, and forwards the packet on LSP 22 in accordance with the forwarding information 57 (114).

ABR P4 receives the packet from backbone router P6 (116), and looks up the outer label of the packet in forwarding information 57 of P4. Based on the forwarding information 57, ABR P4 pops the outer label, swaps the inner label, and forwards the packet over LSP 22 to PE1 in accordance with the forwarding information 57 (118).

Figure 6A:
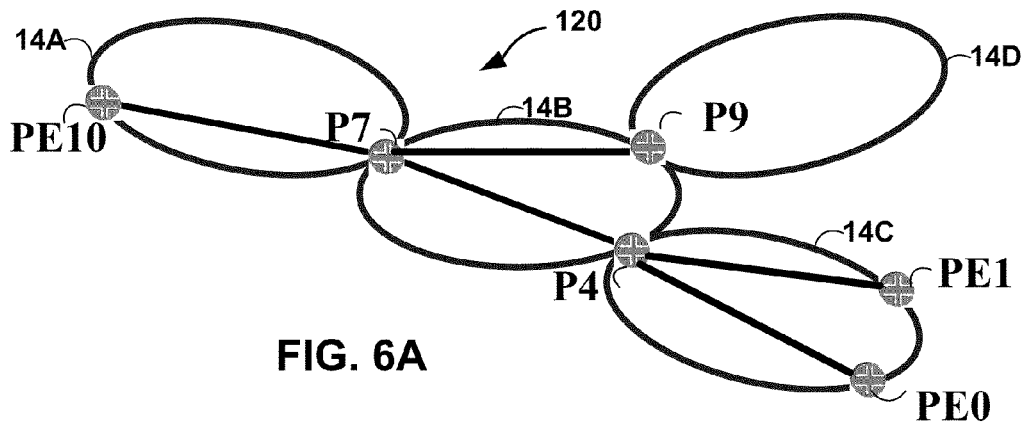
FIG. 6A is a block diagram illustrating another example portion of the network of FIG. 1.

FIG. 6A is a block diagram illustrating another example portion 120 of network 12 of FIG. 1 in which an additional area 14D of network 12 is shown, where LSR P9 is an area border router on the border of areas 14B and 14D. The techniques for extending LDP described herein may also be applied to include multiple layers of hierarchy for multiple IGP areas. For example, P7 is an ABR on the border of areas 14A and 14B. In some embodiments, when advertising a hierarchical label mapping message to LSRs within area 14A (e.g., to PE10), P7 may hierarchically nest all of the labels received from LSRs in area 14B and area 14D within a label mapping TLV and nested sub-TLVs of the hierarchical label mapping message.

Figure 6B:
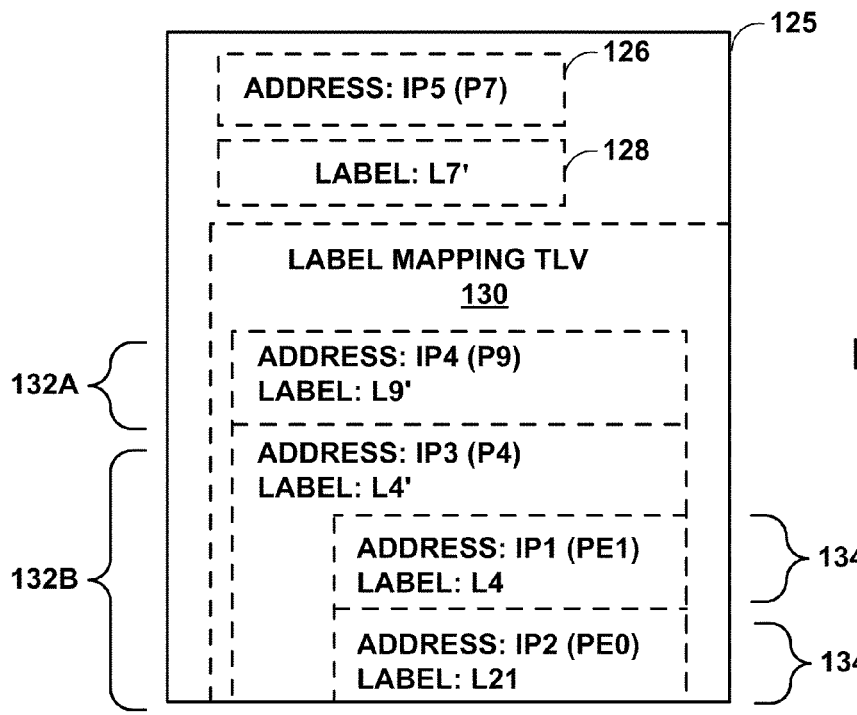
FIG. 6B is a block diagram illustrating an exemplary format of a hierarchical label mapping message that may be advertised by an LSR using extensions to LDP as described herein.

FIG. 6B is a block diagram illustrating an exemplary format of a hierarchical label mapping message 125 that may be advertised by an LSR using extensions to LDP as described herein. For example, hierarchical label mapping message 125 may be a label mapping message generated by ABR P7 as shown in FIG. 6A. ASR P7 may generate hierarchical label mapping message 125 in response to receiving an LDP message from an LDP peer, such as a label mapping message or a label withdraw message.

In the example of FIG. 6B, hierarchical label mapping message 125 includes a FEC TLV 126 and a label TLV 128 as in conventional LDP label mapping messages. FEC TLV 126 and label TLV 128 comprise a portion of hierarchical label mapping message 40 required by the conventional LDP protocol. In accordance with the extensions to LDP described herein, hierarchical label mapping message 125 also includes a newly defined optional label mapping TLV 130, which has sub-TLVs 132A-132B ("sub-TLVs 132") and sub-TLVs 134A-134B ("sub-TLVs 134") (also referred to as sub-sub-TLVs) that may be recursively processed by any LSR receiving the message to any level necessary for that LSR. Label mapping TLV 130 comprises a separate, optional portion of hierarchical label mapping message 125.

The label mapping TLV 130 may recursively encode one or more sub-TLVs 132, 134 that each indicates a label and corresponding loopback address to which the advertising LSR has LDP connectivity. The label mapping TLV 130 may be viewed as recursively encoded in that each of the sub-TLVs 132, 134 are arranged in a tree-like hierarchical order from one or more parent sub-TLVs to one or more child sub-TLVs. In other words, as generated by ABR P7, label mapping TLV 130 may include a sub-TLV 132 for each LSR subtending from ABR P7. Further, each sub-TLV 132 may recursively include within its value field a sub-TLV 134 for each LSR sub-tending from the corresponding LSR. Thus, as shown in FIG. 6B, the label mapping TLV 130 generated by P7 includes a child sub-TLV 132A encoding a label L9' originally advertised by P9 for its loopback address of IP4, and includes a parent sub-TLV 132B encoding a label L4' originally advertised by P4 for its loopback address of IP3. Parent sub-TLV 132B includes a child sub-TLV 134B (i.e., a sub-sub-TLV) encoding a label L4 originally advertised by PE1 for its loopback address of IP1, and a child sub-TLV 134B encoding a label L21 originally advertised by PE0 for its loopback address of IP2.

An LSR receiving the hierarchical label mapping message 125 can rely on being able to reach a destination specified in a sub-TLV 132, 134 at any point within the recursive encoding by using a label stack consisting of a label specified within the required label TLV and those labels defined by sub-TLVs arranged in the tree-like hierarchical order between one of the parent sub-TLVs and that sub-TLVs containing the destination to be reached. For example, assume PE10 receives hierarchical label mapping message 125 from P7. Upon receiving hierarchical label mapping message 125, PE10 may reach PE0 by using a label stack consisting of L7', L4', L21. In addition, PE10 may reach P9 by using a label stack consisting of L7', L9'.

Figure 6C:
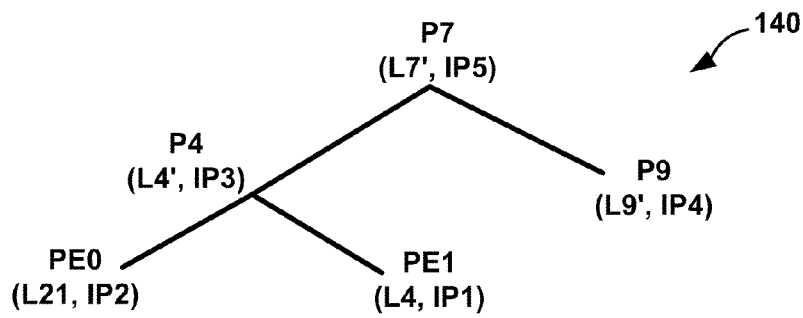
FIG. 6C is a line drawing illustrating an exemplary tree-like hierarchical structure defined by a hierarchical label mapping message that an LSR may logically traverse in constructing a label stack for reaching a destination.

FIG. 6C is a line drawing illustrating an exemplary tree-like hierarchical structure 140 defined by a hierarchical label mapping message that an LSR may logically traverse in constructing a label stack for reaching a destination specified in a sub-TLV at any point within the recursive encoding of the hierarchical label mapping message. The tree-like hierarchical structure 140 corresponds to the manner in which label-FEC mappings are recursively encoded within a hierarchical label mapping message. For example, label-FEC mappings for PE0 and PE1 are specified within child sub-TLVs 134A and 134B of hierarchical label mapping message 125, respectively. Child sub-TLVs 134A and 134B are specified within sub-TLVs of parent sub-TLV 132B, which also specifies a label-FEC mapping for P4.

In this manner, the hierarchical arrangement of label-FEC mappings within hierarchical label mapping message 125 mirrors LSP label distributions through the hierarchical structure of IGP areas (routing domains) within network 12. For example, label-FEC mappings for LSRs received by P7 (e.g., P4 and P9) are recursively encoded as sub-TLVs 132 within a label mapping TLV 130 of hierarchical label mapping message 125, and label-FEC mappings for LSRs received by those LSRS (e.g., PE1 and PE0) are recursively encoded as sub-TLVs 134 (e.g., child sub-TLVs) within the corresponding sub-TLV 132.

Various embodiments of the invention have been described. These and other embodiments are within the scope of the following claims.

The invention claimed is:

1. A method comprising:
receiving a label mapping message at an ingress router within a first routing domain of a network for establishing an inter-routing domain label switched path (LSP), wherein the label mapping message identifies within a first portion of the label mapping message a first label to be used for forwarding network traffic to an intermediate router of the LSP, and identifies within a second portion of the label mapping message a second label to be used for forwarding network traffic to an egress router of the LSP within a second routing domain of the network;
parsing the first portion and the second portion of the label mapping message to identify the first label and the second label;
installing first forwarding state at the ingress router identifying the first label to be used for forwarding network traffic to the intermediate router; and
installing second forwarding state at the ingress router identifying a two-label stack to be used for forwarding network traffic on the inter-routing domain LSP to the egress router, the two-label stack comprising the first label as an outer label and the second label as an inner label.

2. The method of claim 1, further comprising forwarding network traffic to the egress router using the two-label stack according to the second forwarding state.

3. The method of claim 1, further comprising forwarding network traffic to the intermediate router using the first label according to the first forwarding state.

4. The method of claim 1,
wherein the first portion of the label mapping message comprises a required label type-length-value (TLV) that identifies the first label and a forwarding equivalence class (FEC) TLV that specifies a full network address of the intermediate router, and
wherein the second portion of the label mapping message comprises an optional label mapping TLV that identifies the second label and a full network address of the egress router.

5. The method of claim 4, wherein the second label and a network address of the egress router are specified within a sub-TLV of the label mapping TLV.

6. The method of claim 1, wherein the label mapping message identifies within the second portion of the label mapping message a plurality of additional labels to be used for forwarding network traffic to respective egress routers for establishing a plurality of additional LSPs.

7. The method of claim 6, further comprising selecting a subset of the plurality of additional labels in accordance with a policy; and
installing third forwarding state at the ingress router identifying one or more different two-label stacks to be used for forwarding network traffic to respective egress routers corresponding to the selected subset of the plurality of additional labels.

8. The method of claim 1, wherein parsing the first portion and the second portion, installing the first forwarding state, and installing the second forwarding state comprise parsing the first portion and the second portion, installing the first forwarding state, and installing the second forwarding state with a label distribution protocol.

9. The method of claim 1, wherein the first routing domain and the second routing domain comprises first and second autonomous systems.

10. The method of claim 1, wherein the first routing domain and the second routing domain comprises first and second interior gateway protocol (IGP) routing domains of a single autonomous system.

11. A method for distributing labels for establishing an inter-domain label switched path (LSP) for forwarding network traffic, comprising:
executing a routing protocol to maintain routing information for a first routing domain of a network partitioned into a plurality of routing domains;
receiving a label mapping message at a border router of the first routing domain, the label mapping message identifying a first label to be used for forwarding network traffic to a first egress router within a second one of the routing domains of a network;
with the border router, allocating a second label to advertise to neighboring routers in the first routing domain to be used for forwarding network traffic to the first egress router;
with the border router, allocating a third label to advertise to neighboring routers the first routing domain to be used for forwarding network traffic to the border router;
generating a second label mapping message that includes at least both: (i) a required portion of the second label mapping message identifying the third label to be used for forwarding network traffic to the border router, and (ii) a separate optional portion identifying the second label to be used for forwarding network traffic to the first egress router; and
advertising the second label mapping message to one or more neighboring routers within the first routing domain of the network.

12. The method of claim 11, further comprising:
receiving a third label mapping message at the border router that identifies a fourth label to be used for forwarding network traffic to a second egress router within the second routing domain of the network;
with the border router, allocating a fifth label to advertise to neighboring routers in the first routing domain to be used for forwarding network traffic to the second egress router;

generating a fourth label mapping message that identifies within a required portion of the fourth label mapping message the third label to be used for forwarding network traffic to the border router, and identifies within a separate optional portion of the fourth label mapping message the second label to be used for forwarding network traffic to the first egress router and the fifth label to be used for forwarding the network traffic to the second egress router; and advertising the fourth label mapping message to neighboring routers within second routing domain.

13. The method of claim 12, wherein
wherein the required portion of the label mapping message comprises a required label type-length-value (TLV) that identifies the third label and a required forwarding equivalence class (FEC) TLV that identifies a network address of the border router, and
wherein the optional portion of the label mapping message comprises an optional label mapping TLV having a first sub-TLV that identifies the second label and a network address of the first egress router and a second sub-TLV that identifies the fifth label and a network address of the second egress router.

14. The method of claim 12, wherein
wherein the required portion of the label mapping message comprises a required label type-length-value (TLV) that identifies the second label and a required forwarding equivalence class (FEC) TLV that identifies a network address of the border router, and
wherein the optional portion of the label mapping message comprises an optional label mapping TLV having a first sub-TLV that identifies the first label and a network address of the first egress router and a second sub-TLV that identifies the third label and a network address of the second egress router.

15. The method of claim 11, further comprising:
receiving a third label mapping message at the border router that identifies a fourth label to be used for forwarding network traffic to a second egress router within the second routing domain of the network, wherein a network address of the first egress router and a network address of the second egress router may both be represented by a single network address prefix;
allocating the second label to advertise to neighboring routers in the first routing domain to be used for forwarding network traffic to the first egress router or the second egress router;
generating a fourth label mapping message that identifies within a required portion of the fourth label mapping message the third label to be used for forwarding network traffic to the border router, and identifies within a separate optional portion of the fourth label mapping message the second label to be used for forwarding network traffic to the network address prefix; and
advertising the fourth label mapping message to neighboring routers within the first routing domain of the network.

16. The method of claim 11, wherein generating the second label mapping message comprises generating the second label mapping message with a label distribution protocol.

17. The method of claim 16, wherein the label distribution protocol is the Label Distribution Protocol (LDP).

18. The method of claim 16, wherein the label distribution protocol is the Resource Reservation Protocol (RSVP).

19. The method of claim 11, wherein the first routing domain and the second routing domain comprise first and second autonomous systems.

20. The method of claim 11, wherein the first routing domain and the second routing domain comprise first and second interior gateway protocol (IGP) areas of a single autonomous system.

21. The method of claim 11, wherein the routing protocol comprises a link-state routing protocol, wherein the routing information comprises link-state routing information, and wherein the routing domain comprises a link-state routing area.

22. A router comprising:
an interface configured to receive a label mapping message at an ingress router within a first routing domain of a network for establishing an inter-routing domain label switched path (LSP), wherein the label mapping message identifies within a first portion of the label mapping message a first label to be used for forwarding network traffic to an intermediate router of the LSP, and identifies within a second portion of the label mapping message a second label to be used for forwarding network traffic to an egress router of the LSP within a second routing domain of the network;
a control unit configured to the first portion and the second portion of the label mapping message to identify the first label and the second label; and
forwarding information that associates network destinations with specific next hops and corresponding interfaces,
wherein the control unit is configured to install first forwarding state to the forwarding information identifying the first label to be used for forwarding network traffic to the intermediate router, and
wherein the control unit is configured to install second forwarding state to the forwarding information identifying a two-label stack to be used for forwarding network traffic on the inter-routing domain LSP to the egress router, the two-label stack comprising the first label as an outer label and the second label as an inner label.

23. The router of claim 22, wherein the control unit is configured to forward network traffic to the egress router using the two-label stack according to the second forwarding state and forward network traffic to the intermediate router using the first label according to the first forwarding state.

24. The router of claim 22, wherein the first portion of the label mapping message comprises a required label type-length-value (TLV) that identifies the first label and a required forwarding equivalence class (FEC) TLV that specifies a full network address of the intermediate router, and
wherein the second portion of the label mapping message comprises an optional label mapping TLV that identifies the second label and a full network address of the egress router.

25. The router of claim 22, wherein the label mapping message identifies within the second portion of the label mapping message a plurality of additional labels to be used for forwarding network traffic to respective egress routers for establishing a plurality of additional LSPs.

26. The router of claim 22, further comprising a label distribution protocol executing within the control unit to parse the first portion and the second portion of the label mapping message to identify the first label and the second label, and install the first and second forwarding state.

27. A non-transitory computer-readable medium comprising instructions for causing a programmable processor to:
receive a label mapping message at an ingress router within a first routing domain of a network for establishing an inter-routing domain label switched path (LSP), wherein the label mapping message identifies within a first portion of the label mapping message a first label to be used for forwarding network traffic to an intermediate router of the LSP, and identifies within a second portion of the label mapping message a second label to be used for forwarding network traffic to an egress router of the LSP within a second routing domain of the network;

parse the first portion and the second portion of the label mapping message to identify the first label and the second label;

install first forwarding state at the ingress router identifying the first label to be used for forwarding network traffic to the intermediate router; and install second forwarding state at the ingress router identifying a two-label stack to be used for forwarding network traffic on the inter-routing domain LSP to the egress router, the two-label stack comprising the first label as an outer label and the second label as an inner label.

28. A network system comprising:

a computer network comprising a plurality of label switching routers, the label switching routers executing a routing protocol that partitions the computer network into a plurality of routing domains, each of the label switching routers maintaining routing information containing full network addresses for the routing domain in which the respective label switching router resides, the label switching routers executing a label distribution protocol to establish a label switched path that spans at least two of the routing domains, the label distribution protocol for at least one of the label switching routers requiring that network addresses advertised by label mapping messages of the label distribution protocol match the full network addresses of the routing information, and at least a first one of the label switching routers in one of the routing domains outputting one of the label mapping messages to include at least: (i) a first Multi-protocol Label Switching (MPLS) label and a full network address for reaching the first one of the label switching routers, and (ii) one or more additional pairs of MPLS labels and corresponding network addresses for reaching network destinations within the other routing domains.

29. The network system of claim 28, further comprising at least a second one of the label switching routers to receive the label mapping message output by the first one of the label switching router, the label distribution protocol executing on the second one of the label switching routers installing forwarding state within the second one of the label switching routers to forward packets to the first one of the label switching routers using the first MPLS label, and the label distribution protocol executing on the second one of the label switching routers disregarding the additional pairs of MPLS labels and corresponding network addresses specified by the label mapping message.

30. The network system of claim 28, wherein the second one of the label switching routers comprises routing information that excludes network addresses corresponding to the additional pairs of MPLS labels and corresponding network addresses included within the label mapping message output by the first one of the label switching routers for reaching network destinations within the other routing domains.

31. The network system of claim 28, wherein the additional pairs of MPLS labels and corresponding network addresses are recursively encoded within one or more fields of the label mapping message.

32. The network system of claim 28, wherein the additional pairs of MPLS labels and corresponding network addresses are encoded as one or more sub-fields that each indicates a label and corresponding network address to which the advertising label switching router has MPLS forwarding connectivity.

33. The network system of claim 28, wherein the additional pairs of MPLS labels and corresponding network addresses are encoded as one or more sub-fields, the sub-fields being arranged in a tree-like hierarchical order from one or more parent sub-fields to one or more child sub-fields, and each network address specified by any sub-field within the tree-like hierarchical order being reachable using a label stack comprising the first MPLS label and those MPLS labels defined by sub-fields arranged in the tree-like hierarchical order between one of the parent sub-fields and the child sub-field containing the network address to be reached.

34. A method for distributing labels for establishing an inter-area label switched path (LSP) for forwarding network traffic, comprising:

executing, on a first label switching router, a routing protocol to maintain routing information for a first routing domain of a network partitioned into a plurality of routing domains; and outputting a label mapping message to include at least: (i) a first Multi-protocol Label Switching (MPLS) label and a full network address of the first label switching router, and (ii) one or more additional pairs of MPLS labels and corresponding network addresses for reaching for reaching label switching routers in other the routing domains of the network, the additional pairs of MPLS labels and corresponding network addresses encoded as one or more sub-fields of the label mapping message, the sub-fields being arranged in a tree-like hierarchical order from one or more parent sub-fields to one or more child sub-fields, and each network address specified by any sub-field within the tree-like hierarchical order being reachable using a label stack comprising the first MPLS label and those MPLS labels defined by sub-fields arranged in the tree-like hierarchical order between one of the parent sub-fields and the child sub-field containing the network address to be reached.

35. A method comprising:

receiving a label mapping message at an ingress router within a first routing domain of a network for establishing an inter-routing domain label switched path (LSP), wherein the label mapping message identifies within a first portion of the label mapping message a first label to be used for forwarding network traffic to an intermediate router of the LSP, and identifies within a second portion of the label mapping message a second label to be used for forwarding network traffic to an egress router of the LSP within a second routing domain of the network;

parsing the first portion and the second portion of the label mapping message to identify the first label and the second label; and presenting information relating to the LSP to a user, wherein the information includes the first label and the second label.

* * * * *